United States Patent [19]

Obara et al.

[11] Patent Number: 6,073,858

[45] Date of Patent: Jun. 13, 2000

[54] HOT-WATER TYPE HEATING APPARATUS

[75] Inventors: So Obara, Okazaki; Koichi Ito, Kariya; Hikaru Sugi, Nagoya, all of Japan

[73] Assignee: Denso Corporation, Kariya, Japan

[21] Appl. No.: 09/082,780

[22] Filed: May 21, 1998

[30] Foreign Application Priority Data

Jun. 5, 1997 [JP] Japan ...................................... 9-148136
Jan. 20, 1998 [JP] Japan .................................... 10-009047

[51] Int. Cl.[7] .................................................... B60H 1/02
[52] U.S. Cl. .............................. 237/12.3 B; 237/12.3 R; 237/2 A
[58] Field of Search ......................... 237/12.3 B, 12.3 R, 237/2 A; 165/41, 42, 43

[56] References Cited

U.S. PATENT DOCUMENTS

| 4,147,139 | 4/1979 | Hass ..................................... 123/41.54 |
| 4,771,942 | 9/1988 | Arold et al. ........................ 237/12.3 B |
| 5,465,783 | 11/1995 | O'connor ............................. 165/134.1 |

FOREIGN PATENT DOCUMENTS 8-118943  5/1996  Japan .

*Primary Examiner*—Harold Joyce
*Assistant Examiner*—Derek S. Boles
*Attorney, Agent, or Firm*—Harness, Dickey & Pierce, PLC

[57] ABSTRACT

A hot-water type heating apparatus includes a heat exchanger and a flow rate control valve for controlling hot water supplied to the heat exchanger. The heat exchanger includes an inlet side tank placed at a lower side, an outlet side tank placed at an upper side, and a core portion disposed between the inlet side tank and the outlet side tank. An inner space of the inlet side tank is partitioned into four spaces. Hot water from a hot water inlet pipe is divided into four flows, and flows into tubes of the core portion after passing through the four spaces. Because hot water from the hot water inlet pipe is compulsorily divided into four flows to pass through the four spaces, it can prevent hot water from mainly flowing through the core portion at a side proximate to the hot water inlet pipe and a hot water outlet pipe. Thus, in the hot-water type heating apparatus, a temperature difference between air blown from a left side of the heating heat exchanger and air blown from a right side thereof can be decreased without reducing the maximum heating capacity.

13 Claims, 19 Drawing Sheets

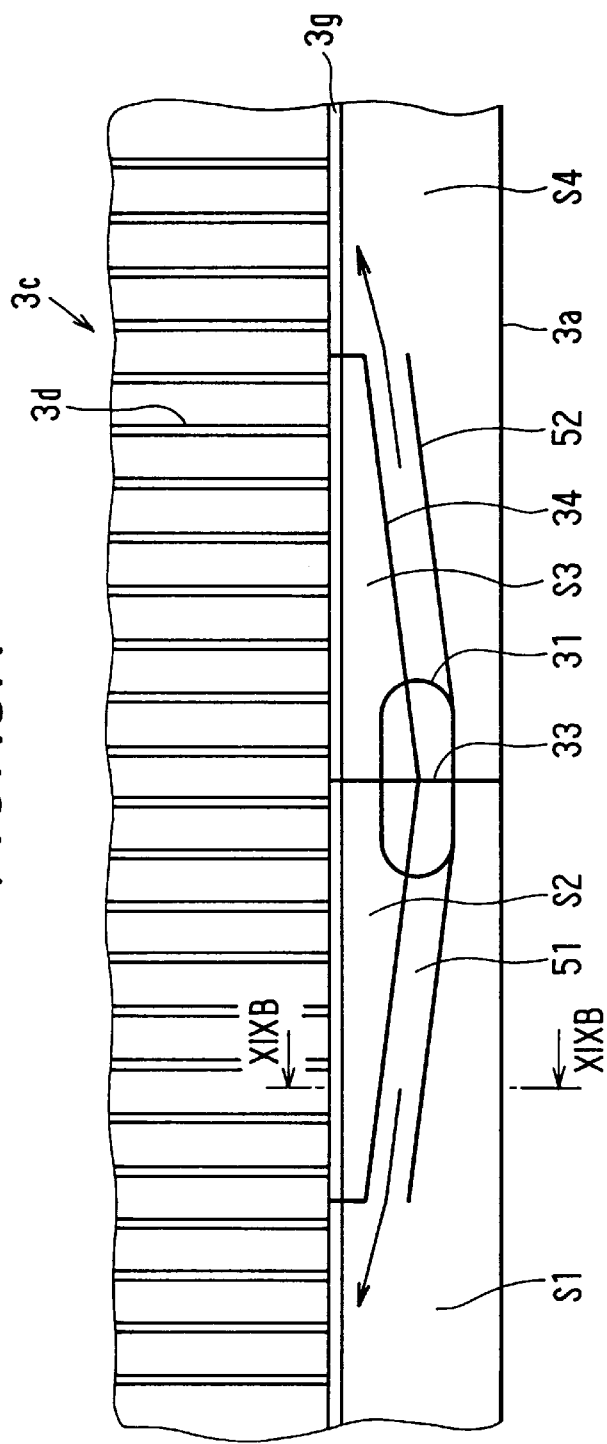
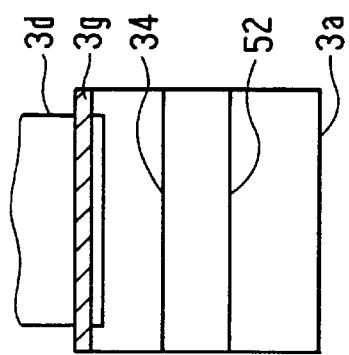

HOT-WATER TYPE HEATING APPARATUS

CROSS-REFERENCE TO RELATED APPLICATION

This application is related to and claims priorities from Japanese Patent Applications No. Hei. 9-148136 filed on Jun. 5, 1997, and No. Hei. 10-9047 filed on Jan. 20, 1998, the contents of which are hereby incorporated by reference.

BACKGROUND OF THE INVENTION

1. Field of the Invention

The present invention relates to a hot-water type heating apparatus having a flow rate control valve for controlling a flow rate of hot water. The hot-water type heating apparatus is suitable for an air conditioning apparatus for a vehicle.

2. Description of Related Art

Conventionally, a flow rate of hot water flowing through a heating heat exchanger is controlled to control a temperature of air blown toward a passenger compartment. The applicant proposes a hot-water type heating apparatus as described in JP-A-8-118943. In the hot-water type heating apparatus, a flow rate control valve for controlling the flow rate of hot water is integrated with a heating heat exchanger, an inlet side tank through which hot water controlled by the flow rate control valve flows into the heating heat exchanger is disposed at a lower side of the heating heat exchanger, and an outlet side tank is disposed at an upper side thereof. In the heating heat exchanger, hot water flows in one way from a lower side toward an upper side of the core portion; and therefore, air contained in hot water can be smoothly discharged to the outside of the heating heat exchanger. However, when the flow rate of hot water flowing through the heating heat exchanger is controlled at a minute flow rate, air blown from the heating heat exchanger has a different temperature distribution in a left-right direction (i.e., a longitudinal direction of tank) of the heating heat exchanger. As a result, the temperature of air blown toward a right side in the passenger compartment is different from the temperature of air blown toward a left side in the passenger compartment. To overcome the problem, in the hot-water type heating apparatus, a hot-water distribution unit for uniformly distributing hot water in the heating heat exchanger in the left-right direction is provided in the inlet side tank or the outlet side tank. That is, a pipe-like member extending in the longitudinal direction of the tank is provided in the inlet side tank. The pipe-like member has a plurality of hot water holes through which hot water distributes within the inlet side tank.

However, in the above-described hot-water type heating apparatus, hot water is supplied to the inlet side tank of the heating heat exchanger through the hot water holes provided in the pipe-like member even during the maximum heating mode where the flow rate control valve controls the flow rate of hot water at the maximum flow rate. Therefore, a flow resistance of hot water becomes higher, hot water supplied to the heating heat exchanger is restricted, and thereby reducing the maximum heating capacity for the passenger compartment.

SUMMARY OF THE INVENTION

In view of the foregoing problems, it is an object of the present invention to provide a hot-water type heating apparatus having a heat exchanger in which hot water flows in one way from a lower side to an upper side of a core portion. In the heat exchanger, a temperature difference of air blown from left and right sides of the heat exchanger can be decreased without reducing the maximum heating capacity of the heat exchanger.

According to present invention, a hot-water type heating apparatus includes a heat exchanger for heating air passing therethrough using hot water as a heating source, and a flow rate control valve for controlling a flow rate of hot water supplied to the heat exchanger. In the heat exchanger, hot water from an inlet side tank flows into an outlet side tank through a core portion in one way, the inlet side tank has a plurality of inner spaces partitioned from each other in a longitudinal direction of the inlet side tank, and the inner spaces are formed in such a manner that hot water from an inlet pipe is divided to pass through the inner spaces and flows into the core portion through the inner spaces. Further, the inlet side tank is placed at a position lower than the outlet side tank. In the heat exchanger, because hot water from the inlet pipe is compulsorily divided into the plurality of inner spaces to pass through the inner spaces in the longitudinal direction of the inlet side tank, it can prevent hot water from mainly flowing through the core portion proximate to the inlet pipe and an outlet pipe due to buoyancy affected to hot water. Thus, hot water can be uniformly distributed into the tubes of the core portion in the longitudinal direction of the inlet side tank, and a temperature difference of air blown from the heating heat exchanger in the longitudinal direction (e.g., left-right direction) of the inlet side tank can be reduced.

Preferably, the inlet side tank has therein a partition member for partitioning the inner spaces from each other in the longitudinal direction of the inlet side tank. Because the partition member is only for partitioning the inner spaces in the longitudinal direction, flow resistance of hot water is not greatly increased by providing the partition member; and therefore, the flow rate of hot water flowing through the core portion is not affected by the partition member even during the maximum heating capacity.

More preferably, each of the spaces of the inlet side tank has a dimension in the longitudinal direction of the inlet side tank, and the dimension is lower than 100 mm. Therefore, the temperature difference of air blown from the heat exchanger can be effectively reduced.

Further, the inlet side tank forms a tank water passage having a water-passing sectional area, the inlet pipe forms a pipe water passage having a water-passing sectional area through which hot water flows into the tank water passage, and the inlet side tank has prevention means for preventing a sectional area of the tank water passage from being rapidly increased as compared with the sectional area of the pipe water passage. Therefore, buoyancy affected to flow of hot water is relatively reduced when the heat exchanger is inclined at left end side or a right end side thereof. Thus, even when the heat exchanger is inclined at a left end side or a right end side, it can prevent an amount of hot water flowing into the left end side or the right end side of the core portion from being reduced, and the temperature difference of air blown from the heat exchanger can be decreased.

BRIEF DESCRIPTION OF THE DRAWINGS

Additional objects and advantages of the present invention will be more readily apparent from the following detailed description of preferred embodiments when taken together with the accompanying drawings, in which:

FIG. 19A is a cross-sectional view showing a main portion of a heating heat exchanger according to an eighth preferred embodiment of the present invention, and FIG. 19B is a cross-sectional view taken along line XIXB—XIXB in FIG. 19A;

DETAILED DESCRIPTION OF THE PRESENTLY PREFERRED EMBODIMENTS

Preferred embodiments of the present invention are described hereinafter with reference to the accompanying drawings.

Figure 1:
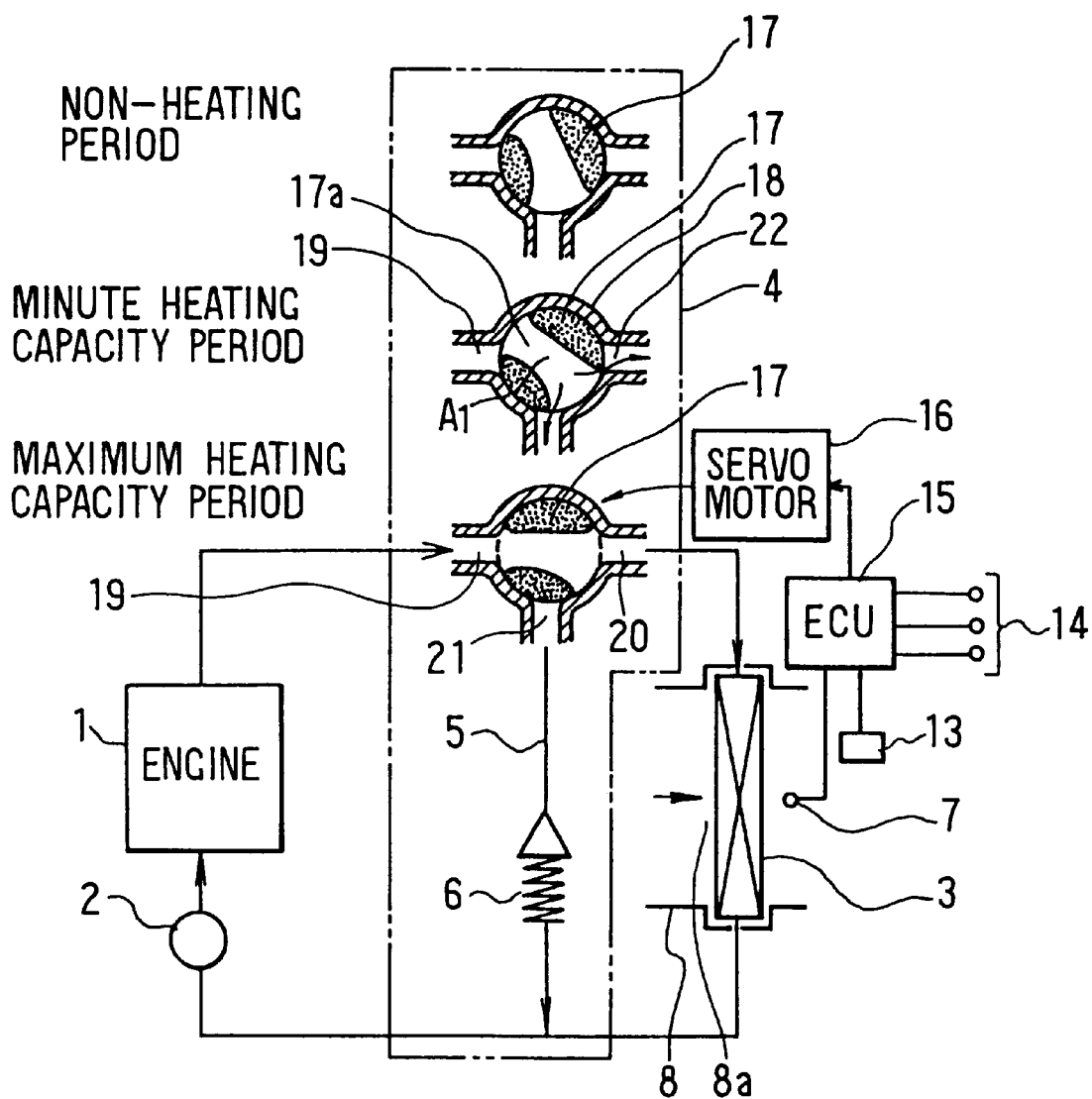
FIG. 1 is a diagrammatic view showing a hot water circuit of a hot-water type heating apparatus according to a first preferred embodiment of the present invention.

A first preferred embodiment of the present invention will be now described with reference to FIGS. 1–4. As shown in FIG. 1, a water pump 2 is driven by a water-cooled type engine 1 to circulate water in a coolant water circuit (i.e., hot water circuit). A hot-water type heating apparatus includes a heating heat exchanger 3 having a heater core for heating air passing therethrough using hot water as a heating source, and a flow rate control valve 4 for controlling a flow rate of hot water supplied to the heating heat exchanger 3. The flow rate control valve 4 is a three-way type valve having three hot water flow ports.

A bypass passage 5 is provided in parallel with the heating heat exchanger 3, and a pressure-responsive valve 6 (i.e., constant-differential pressure valve) is disposed in the bypass passage 5. The pressure-responsive valve 6 is opened when a pressure difference between its upstream and downstream sides reaches a predetermined value, and functions to make inlet and outlet pressures of the heating heat exchanger 3 substantially equal even if the pressure discharged from the water pump 2 fluctuates due to rotational speed fluctuation of the engine 1. The flow rate control valve 4 including the bypass passage 5 and the pressure-responsive valve 6 is assembled to the heating heat exchanger 3 integrally.

A temperature sensor 7 is disposed in an air conditioning case 8 on a downstream air side of the heating heat exchanger 3 at a position immediately before a branch point of various air outlets such as a face air outlet, a defroster air outlet and a foot air outlet. The air conditioning case 8 forms an air passage 8a through which air is blown toward a passenger compartment through the air outlets. The temperature sensor 7 is composed of a thermistor and detects the temperature of air blown toward the passenger compartment.

Figure 2:
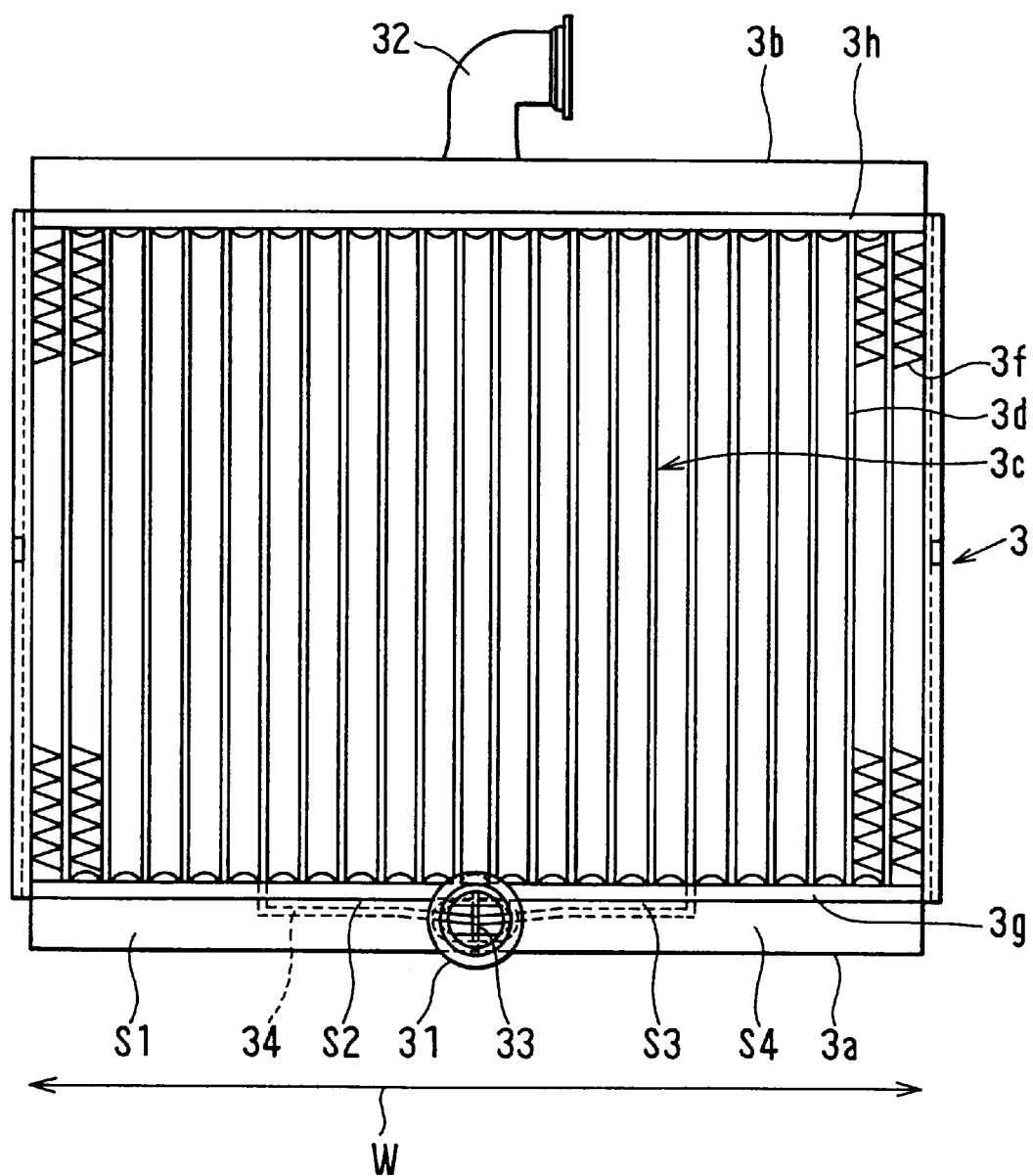
FIG. 2 is a front view showing a heating heat exchanger according to the first embodiment.
Figure 3:
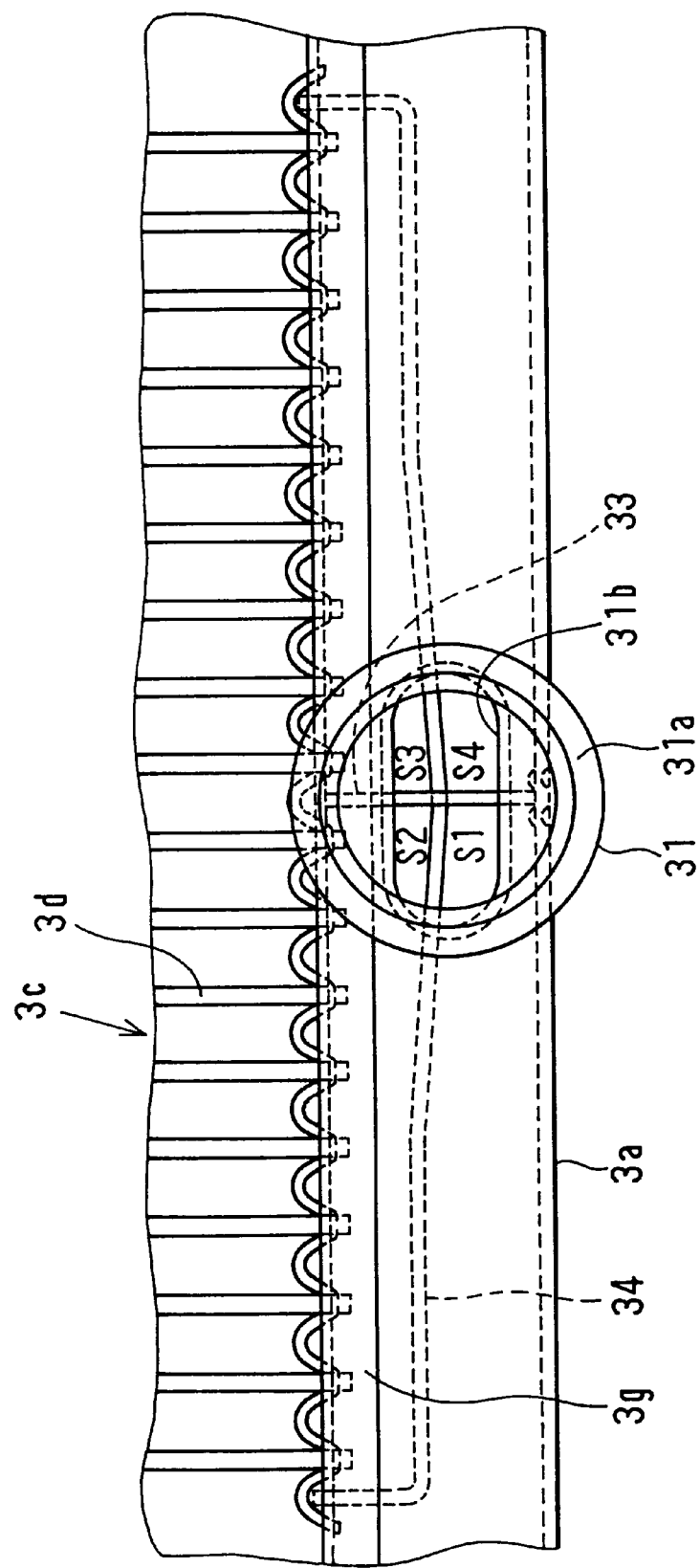
FIG. 3 is a partly enlarged view showing a part of the heating heat exchanger in FIG. 2.

As shown in FIGS. 2 and 3, the heating heat exchanger 3 includes an inlet side tank 3a disposed at a lower side thereof, an outlet side tank 3b disposed at an upper side thereof, and a core portion 3c disposed between the inlet side tank 3a and the outlet side tank 3b. Hot water having been controlled by the flow rate control valve 4 flows into the inlet side tank 3a, and flows through the core portion 3c in one way from a lower side toward an upper side thereof. The heating heat exchanger 3 is disposed to be approximately perpendicular to the air passage 8a in such a manner that the inlet side tank 3a is placed at a lower side and the outlet side tank 3b is placed at an upper side in the air conditioning case 8.

In FIG. 1, the inlet side tank 3a is indicated at an upper side and the outlet side tank 3b is indicated at a lower side to simply indicate the hot water circuit. However, actually, the inlet side tank 3a is disposed at the lower side of the heating heat exchanger 3 and the outlet side tank 3b is disposed at the upper side thereof, as shown in FIG. 2.

The core portion 3c includes a plurality of flat tubes 3d disposed in parallel in a width direction W (i.e., a longitudinal direction of the tanks 3a, 3b, left-right direction in FIG. 2), and corrugated fins 3f each of which is disposed between adjacent flat tubes 3d. Each of the flat tubes 3d has an elliptical cross section, and air passes through the heating heat exchanger 3 in parallel with a longer diameter direction of the elliptical cross section of the flat tube 3d. Each two ends of the flat tubes 3d are inserted into tube insertion holes provided in sheet members 3g, 3h of the tanks 3a, 3b, so that each of the flat tubes 3d is communicated with the inlet side tank 3a and the outlet side tank 3b.

A hot water inlet pipe 31 is connected to a center portion of the inlet side tank 3a in the width direction W, and a hot water outlet pipe 32 is connected to a center portion of the outlet side tank 3b in the width direction W. A circular pipe portion 31a connected to a hot water outlet side of the flow rate control valve 4 is formed in the hot water inlet pipe 31 at a paper front side in FIG. 3, and a flat pipe portion 31b is formed in the hot water inlet pipe 31 on a downstream air side of the circular pipe portion 31a at a paper back side in FIG. 3. The flat pipe portion 31b of the hot water inlet pipe 31 is inserted into a flat hole provided in a center wall surface of the inlet side tank 3a to be connected to the inlet side tank 3a. Two partition plates 33, 34 are disposed within the inlet side tank 3a to be connected to an inner wall of the inlet side tank 3a and an inner surface of the sheet member 3g. The partition plate 33 contacts an outlet end surface of the flat pipe portion 31b in an up-down direction in FIG. 3 so that an inner space of the inlet side tank 3a is partitioned into a left space S1, S2 and a right space S3, S4 in the width direction W of the inlet side tank 3a. The partition plate 34 contacts the outlet end surface of the flat pipe portion 31b in a left-right direction in FIG. 3 so that the inner space of the inlet side tank 3a is partitioned into an upper side space S2, S3 and a lower side space S1, S4.

In the first embodiment, a slit is formed in each partition plate 33, 34, and the partition plates 33, 34 are crossed from each other using the slit at an outlet portion of the flat pipe portion 31b. That is, by the crossed partition plates 33, 34, the inner space of the inlet side tank 3a is partitioned into four spaces S1, S2, S3, S4. In this case, an upper end of the partition plate 33 and two ends of the partition plate 34 in the width direction W are respectively connected to the inner wall surface of the sheet member 3g. Thus, hot water from the hot water inlet pipe 31 is divided into four flows toward the four spaces S1, S2, S3, S4 at the outlet portion of the flat pipe portion 31b, and flows through the four spaces S1, S2, S3, S4 in the inlet side tank 3a. After respectively passing through the four spaces S1, S2, S3, S4, hot water flows into the flat tubes 3d of the core portion 3c from the lower side toward the upper side thereof.

Each of the above-described member of the heating heat exchanger 3 is made of aluminum (including aluminum allow). After integrally assembling each member as shown in FIG. 2, the assembled member is held in a suitable jig, and is brazed until a melting point of a brazing filler metal to form the heating heat exchanger 3. A temperature setting unit 13 for setting a temperature of the passenger compartment is composed of a switch, variable resistor, or the like which is manually operable by the passenger in the passenger compartment. A sensor group 14 detects environmental factors relating to a temperature control of the passenger compartment, such as an outside air temperature, a hot water temperature, and a sunlight amount. An air conditioning control unit 15 (ECU) is composed of a microcomputer or the like, and output temperature-control signals based on input signals from the sensors 7, 14 and the temperature setting unit 13.

A servomotor 16 is controlled based on temperature control signals from the air conditioning control unit 15 (ECU), and rotates a valve body 17 of the flow rate control valve 4. In the first embodiment, the servomotor 16 is used as a valve body operation unit. However, as the valve body operation unit, a manual operation mechanism such as levers, wires, and the like may be used.

In the flow rate control valve 4, a cylindrical valve body 17 is ratatably accommodated in a housing 18. The housing 18 includes a hot water inlet pipe 19 into which hot water flows from the engine 1, a hot water outlet pipe 20 connected to the hot water inlet pipe 31 of the inlet side tank 3a of the heating heat exchanger 3, and a bypass outlet pipe 21 connected to a hot water inlet side of the bypass circuit 5. On the other hand, the valve body 17 includes a control passage for controlling opening areas of the inlet pipe 19 and the outlet pipes 20, 21.

During the maximum heating capacity, the valve body 17 of the flow rate control valve 4 is rotated at the maximum opening position by the servomotor 16 or the manual operation mechanism, and the control passage 17a of the valve body 17 is communicated with both the hot water inlet pipe 19 and the hot water outlet pipe 20 at the maximum opening positions. Therefore, during the maximum heating capacity, both of the hot water inlet pipe 19 and the hot water outlet pipe 20 are fully opened, and the bypass outlet pipe 21 connected to the bypass circuit 5 is fully closed. As a result, the whole hot water from the engine 1 flows into the heating heat exchanger 3 to provide the maximum heating capacity for the passenger compartment.

During non-heating mode (i.e., the maximum cooling mode when an evaporator is provided in the air conditioning unit 8 and a refrigerant cycle is operated), the valve body 17 of the flow rate control valve 4 is rotated at a zero opening position. Therefore, the control passage 17a of the valve body 17 is only communicated with the bypass outlet pipe 21 to fully open the bypass circuit 5, and the hot water outlet pipe 20 is fully closed to interrupt the flow of hot water to the heating heat exchanger 3. On the other hand, a minimum opening area having 2 mm. diam. round hole is provided to continue the flow of hot water from the hot water inlet pipe 19 to the bypass outlet pipe 21 without fully closing the hot water inlet pipe 19. Because hot water continually flows from the hot water inlet pipe 19 to the bypass circuit 5, it can prevent noise from a water-hammer effect due to sudden interruption of the flow of hot water from being caused.

Next, during minute heating capacity, the valve body 17 is rotated at a minute opening position so that the control passage 17a is communicated with both the hot water inlet pipe 19 and the hot water outlet pipe 20 by small opening degrees. Therefore, two-stage restriction state restricting both opening areas of the hot water inlet pipe 19 and the hot water outlet pipe 20 is obtained. A middle portion (i.e., area A in FIG. 1) between both restriction portions of the hot water inlet pipe 19 and the hot water outlet pipe 20 communicates with the bypass outlet pipe 21 in a fully opening degree. Therefore, the pressure in the middle portion A can be reduced so that the pressure difference between the upstream and downstream water sides of the heating heat exchanger 3 can be made sufficiently small. As a result, the variation in flow rate of hot water with respect to the variation in the opening degree of the valve body 17 can be alleviated without requiring a particularly small opening area. That is, control gain of the temperature of blown-air can be reduced, and the temperature of air blown toward the passenger compartment can be controlled precisely.

Further, relative to the hot water pressure due to the variation in the rotation speed of the engine 1, the opening degree of the pressure-responsive valve 6 is increased as increasing the hot water pressure. Therefore, the variation in the pressure difference between the upstream and downstream water sides of the heating heat exchanger 3 can be reduced to prevent the variation in blown-air temperature due to the variation in rotation speed of the engine 1.

As shown in FIG. 3, the two partition plates 33, 34 are disposed in the inlet side tank 3a so that the inner space of the inlet side tank 3a are partitioned into the four spaces S1, S2, S3, S4 along the width direction W. Therefore, hot water from the hot water inlet pipe 31 is compulsorily divided into four flows toward the four spaces S1, S2, S3, S4 at the outlet portion of the flat pipe portion 31b, and flows through the four spaces S1, S2, S3, S4. As a result, in the heating heat exchanger 3 which is vertically disposed in the air conditioning case 8 in such a manner that the inlet side tank 3a is placed at the lower side and outlet side tank 3b is placed at the upper side thereof, it can prevent hot water only from flowing through the flat tubes 3d proximate to the hot water inlet pipe 31 and the hot water outlet pipe 32 (i.e., the center portion in the width direction W in FIGS. 2 and 3) even when the amount of hot water flowing through the heating heat exchanger 3 is controlled at a minute amount.

Thus, hot water uniformly flows through the plurality of tubes 3d in the width direction W of the core portion 3c to decrease the temperature difference of air blown from left and right sides of the heating heat exchanger 3. Further, because hot water from the hot water inlet pipe 31 is divided into four flows by the partition plates 33, 34 without increasing the flow resistance of hot water, the flow rate of hot water supplied to the heating heat exchanger 3 is not restricted by providing the partition plates 33, 34, and the heating capacity for the passenger compartment is not affected by providing the partition plates 33, 34 during the maximum heating mode.

Figure 4:
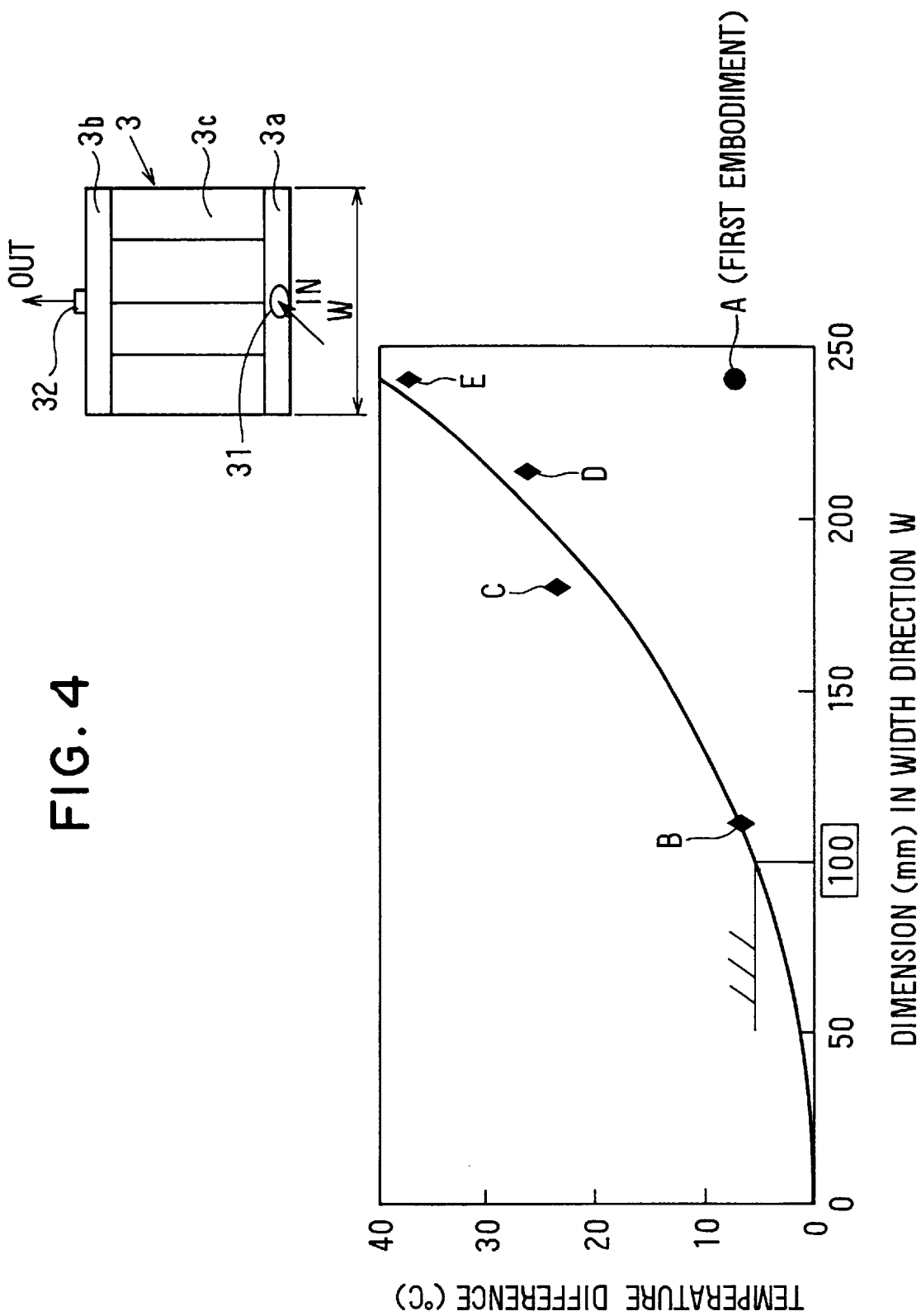
FIG. 4 is a graph showing the relationship between a dimension of the heating heat exchanger in a width direction W in FIG. 2 and a temperature difference of air blown from left and right sides of the heating heat exchanger in FIG. 2.

FIG. 4 shows an experimental result performed by the inventors of the present invention. In FIG. 4, the flow rate of hot water circulating in the heating heat exchanger 3 is 0.6 liter/min, a volume of air blown toward the heating heat exchanger 3 is 200 m³/h, the temperature of the hot water inlet of the heating heat exchanger 3 is 88° C., and the temperature of suction air in the air conditioning case 8 is 5° C. Further, the heating heat exchanger 3 is disposed in the air passage 8a vertically so that the inlet side tank 3a is placed at the lower side and the outlet side tank 3b is placed at an upper side thereof. FIG. 4 shows the relationship between the dimension (i.e., tank length) of the heating heat exchanger 3 in the width direction W and the temperature difference (i.e., the maximum temperature difference) of air blown from the heating heat exchanger 3 in the left-right direction (i.e., the width direction W) of the heating heat exchanger. In the heating heat exchanger 3 according to the first embodiment of the present invention indicated by A in FIG. 4, the dimension in the width direction W is 240 mm; and therefore, each dimension of the spaces S2, S3 in the width direction W is 60 mm. On the other hand, in the cases indicated by B, C, D, E in FIG. 4, the two partition plates 33, 34 are not provided in the inlet side tank 3a so that only a communication space is formed in the inlet side tank 3a. In the cases indicated by B, C, D, E in FIG. 4, the dimension of the heating heat exchanger 3 in the width direction W is changed in a range of 110 mm–240 mm, and the temperature difference of blow-air in the width direction W is increased as increasing the dimension of the heating heat exchanger 3 in the width direction W. When the dimension of the heating heat exchanger 3 in the width direction W is 240 mm (i.e., the case indicated by E in FIG. 4), the temperature difference of blown air is increased to 37° C. However, according to the heating heat exchanger 3 of the first embodiment indicated by A in FIG. 4, because each dimension of the core portion 3c corresponding to each space S1, S2, S3, S4 in the width direction W is 60 mm even when the dimension of the heating heat exchanger in the width direction W is 240 mm, the temperature difference of blown-air in the width direction W is 8° C.

As the experimental result shown in FIG. 4, when the dimension in the width direction W is made lower than 100 mm, the temperature difference of blown-air in the width direction W can be decreased at 7° C. Thus, preferably, each dimension of the spaces S1, S2, S3, S4 in the width direction W is set to be lower than 100 mm.

A second preferred embodiment of the present invention will be now described with reference to FIG. 5.

The second embodiment is applied to a heating heat exchanger 3 having a short dimension in the width direction W. When the dimension of a heating heat exchanger 3 in the width direction W has a dimension of lower than 200 mm, only the partition plate 33 extending in the up-down direction of the first embodiment is disposed in the inlet side tank 3a. According to the second embodiment, the inner space of the inlet side tank 3a is partitioned by only the partition plate 33 into a first space S1 and a second space S2. In this case, because each dimension of the spaces S1, S2 in the width direction W becomes lower than 100 mm, the temperature difference (i.e., the maximum temperature difference) of air blown from the heating heat exchanger 3 in the width direction W can be reduced at a small value.

A third preferred embodiment of the present invention will be now described with reference to FIGS. 6–9.

Figure 6:
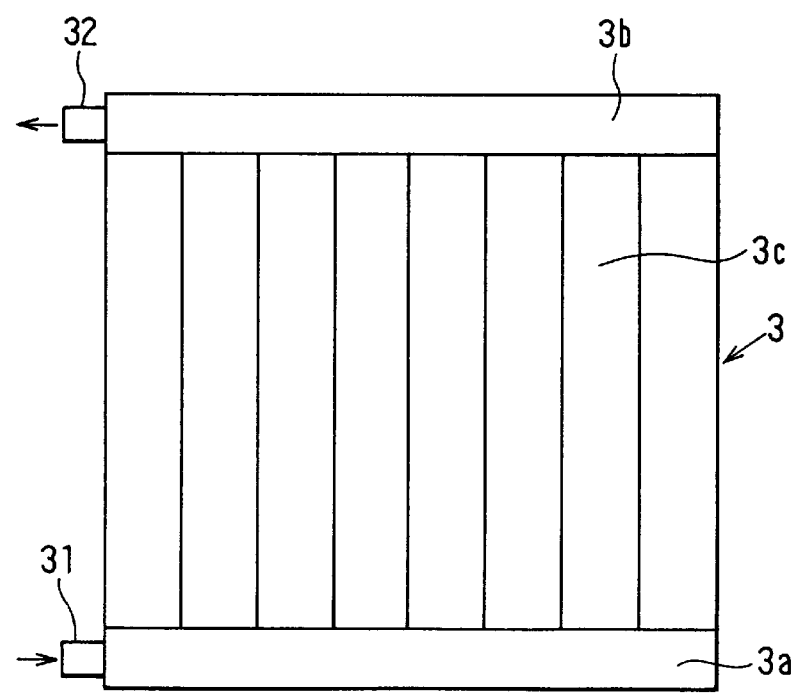
FIG. 6 is a schematic plan view showing a heating heat exchanger according to a third preferred embodiment of the present invention.

In the above-described first and second embodiments, the hot water inlet pipe 31 and the hot water outlet pipe 32 are respectively provided at center portions in the inlet side tank 3a and the outlet side tank 3b in the width direction W. However, in the third embodiment, as shown in FIGS. 6–8, the hot water inlet pipe 31 and the hot water outlet pipe 32 are respectively provided at left ends of the inlet side tank 3a and the outlet side tank 3b to protrude from the left side ends of the inlet side tank 3a and the outlet side tank 3b in the width direction W.

Figure 7:
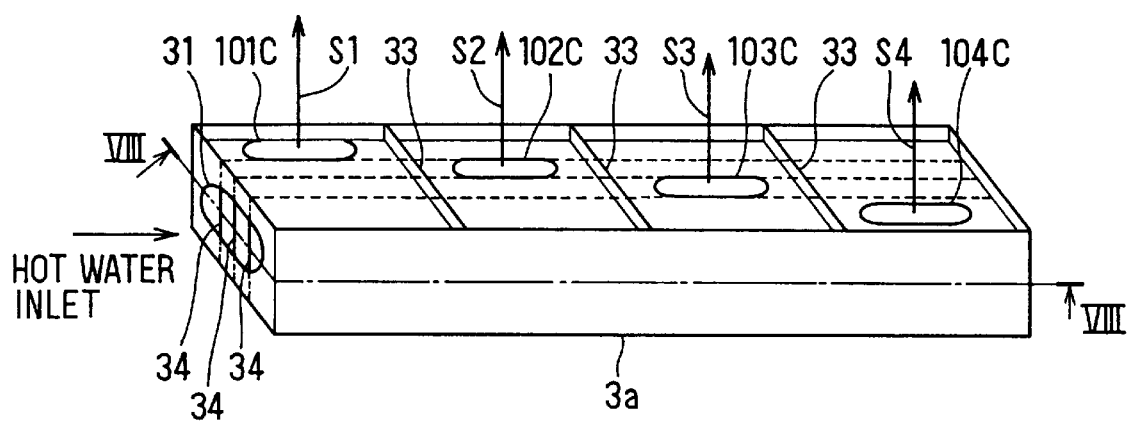
FIG. 7 is a schematic perspective view showing a partition structure of an inlet side tank of the heating heat exchanger according to the third embodiment.
Figure 8:
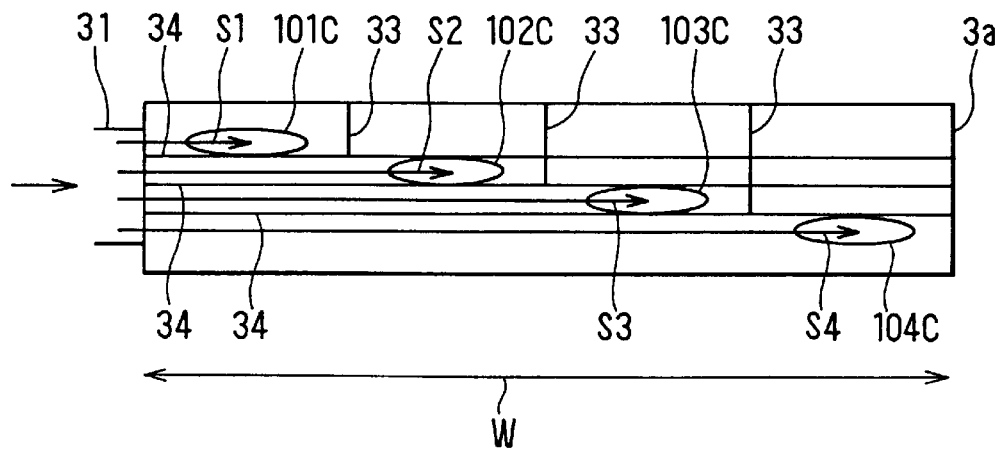
FIG. 8 is a cross-sectional view taken along line VIII—VIII in FIG. 7.

In the third embodiment, the inner space of the inlet side tank 3a is partitioned as shown in FIGS. 7 and 8. That is, three partition plates 34 extending in the width direction W are disposed in the inlet side tank 3a in parallel to have a predetermined distance between adjacent two of the partition plates 34, and each partition surface of the three partition plates 34 is in the up-down direction of the heating heat exchanger 3. Further, three partition plates 33 perpendicular to the partition plates 34 are disposed in parallel within the inlet side tank 3a to have a predetermined distance between adjacent two of the partition plates 33. Thus, the inner space of the inlet side tank 3a is partitioned into four spaces S1, S2, S3, S4 indicated by arrows in FIG. 8. Each arrow shown in FIG. 8 indicates the flow of hot water, and hot water flows into the flat tubes 3*d* from elliptical portions 101C, 102C, 103C, 104C.

According to the third embodiment, hot water from the hot water inlet pipe 31 is divided into four spaces S1, S2, S3, S4, and flows through the four spaces S1, S2, S3, S4 while maintaining the divided state. That is, after hot water flows in the inlet side tank 3*a* along the width direction W as shown in FIG. 8, the hot water flows through the elliptical portions 101C, 102C, 103C, 104C in the up-down direction of the heating heat exchanger 3. In the third embodiment, because hot water flows through the partitioned four spaces S1, S2, S3, S4 along the width direction W, an effect similar to that in the first embodiment can be proposed.

Figure 9:
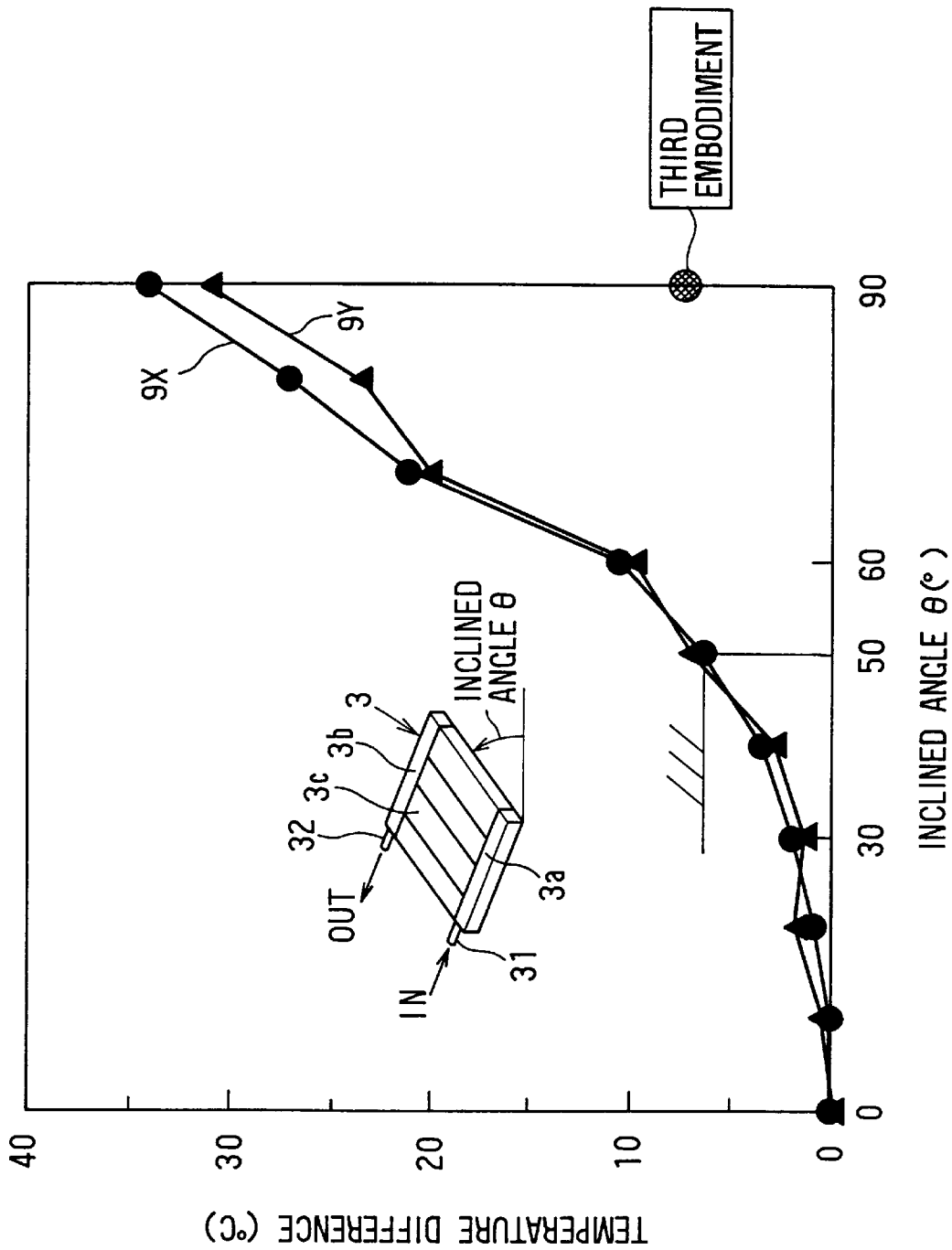
FIG. 9 is a graph showing the relationship between an inclined angle θ of the heating heat exchanger and a temperature difference of air blown from left and right sides of the heating heat exchanger according to the third embodiment.

FIG. 9 shows the relationship between the temperature difference (the maximum temperature difference) of air blown from the heating heat exchanger 3 in the width direction W and an inclined angle θ of the heating heat exchanger 3. In FIG. 9, graphs 9X and 9Y show a case where the partition plates 33, 34 are not provided in the inlet side tank 3*a* of the heating heat exchanger 3 in the third embodiment. Further, the graph 9X shows the temperature difference of air blown toward a foot air outlet of the air conditioning case 8, and the graph 9Y shows the temperature difference of air blown toward a face air outlet of the air conditioning case 8. In FIG. 9, expect of the structure of the heating heat exchanger 3, the experimental conditions are similar to those in FIG. 4. As shown in FIG. 9, as increasing the inclined angle θ, hot water readily flows through the flat tubes proximate to the hot water inlet pipe 31 and the hot water outlet pipe 32 by buoyancy affect due to the specific-gravity decrease of the hot water itself; and therefore, the temperature difference of blown-air in the width direction W is increased. When the inclined angle θ of the heating heat exchanger 3 is made lower than 50°, the temperature difference of blown-air in the width direction W can be controlled at a value lower than 7° C. However, actually, the heating heat exchanger having the inclined angle lower than 50° is not used for a small arrangement space from a space restriction or the like in the vehicle.

According to the third embodiment of the present invention, by providing the partition plates 33, 34 in the inlet side tank 3*a* as shown in FIGS. 6–8, the temperature difference of blow-air in the width direction W can be controlled at 8° C. as shown in FIG. 9 even when the heating heat exchanger 3 is disposed vertically (i.e., θ=90°).

Figure 10:
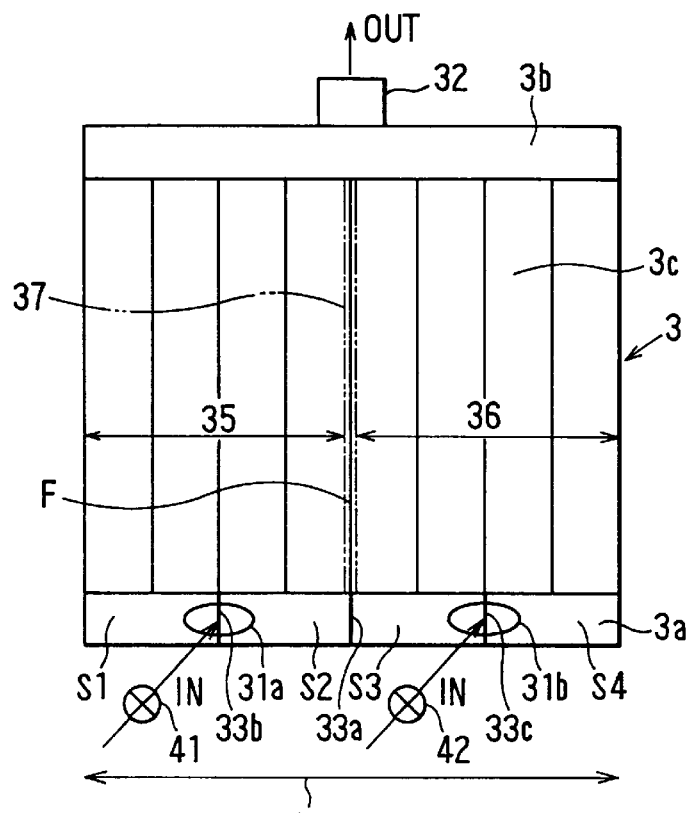
FIG. 10 is a schematic plan view showing a heating heat exchanger according to a fourth preferred embodiment of the present invention.

A fourth preferred embodiment of the present invention will be now described with reference to FIG. 10.

In the fourth embodiment, a heating heat exchanger 3 is applied to an air conditioning apparatus where a temperature of air blown toward a left side in the passenger compartment and a temperature of air blown toward a right side in the passenger compartment can be independently controlled. In the fourth embodiment, a partition plate 33*a* is disposed in the inlet side tank 3*a* at a center portion in the width direction so that the inner space of the inlet side tank 3*a* is partitioned into two spaces in the width direction W. A first hot water inlet pipe 31*a* and a second hot water inlet pipe 31*b* are respectively provided at center portions of the left and right two spaces of the partition plate 33*a* in the width direction W, and partition plates 33*b*, 33*c* extending in the up-down direction are respectively disposed at centers of outlets of the first and second hot water inlet pipes 31*a*, 31*b*. Therefore, the left and right spaces of the partition plate 33*a* are further partitioned by the partition plates 33*b*, 33*c* into four spaces S1, S2, S3, S4. Thus, hot water from the first hot water inlet pipe 31*a* is divided into two flows and flows through the spaces S1, S2. The hot water in the spaces S1, S2 flows into the first core portion 35. On the other hand, hot water from the second hot water inlet pipe 31*b* is divided into two flows and flows through the spaces S3, S4. The hot water in the spaces S3, S4 flows into the second core portion 36.

The core portion of the heating heat exchanger 3 is partitioned by a partition plate 37 into a first core portion 35 and a second core portion 36. To independently control the amount (i.e., flow rate) of hot water flowing into the first core portion 35 and the amount of hot water flowing into the second core portion 36, a first control valve 41 is disposed at an upstream water side of the first hot water inlet pipe 31*a*, and a second control valve 42 is disposed at an upstream water side of the second hot water inlet pipe 31*b*. The heating heat exchanger 3 is disposed approximately vertically in the air passage 8*a* within the air conditioning case 8 in such a manner that the inlet side tank 3*a* is placed at a lower side and the outlet side tank 3*b* is placed at an upper side thereof. Further, the partition plate 37 partitions the downstream air passage of the heater core 3*c*, and is disposed in the air conditioning case 8 on the extending line F of the partition plate 33*a* so that the air passage 8*a* on a downstream air side of the heating heat exchanger is partitioned into a left side air passage and a right side air passage. By providing the partition plate 37, the core portion 3*c* is also partitioned into the first core portion 35 and the second core portion 36 in the width direction W.

Accordingly, by respectively independently controlling opening degrees of the first control valve 41 and the second control valve 42, the amount of hot water flowing through the tubes 3*d* of the first core portion 35 and the amount of hot water flowing through the tubes 3*d* of the second core portion 36 can be respectively independently controlled. Therefore, the temperature of air blown from the first core portion 35 toward a left side (e.g., front passenger's side next to driver's side) in the passenger compartment and the temperature of air blown from the second core portion 36 toward a right side (e.g., driver's side) in the passenger compartment can be independently controlled.

Further, in the fourth embodiment, hot water from the first hot water inlet pipe 31*a* and hot water from the second hot water inlet pipe 31*b* are respectively divided into by the partition plates 33*b*, 33*c*. Therefore, in each of the first core portion 35 and the second core portion 36, the left and right temperature difference (i.e., the maximum temperature difference) of blown-air can be reduced.

Figure 11:
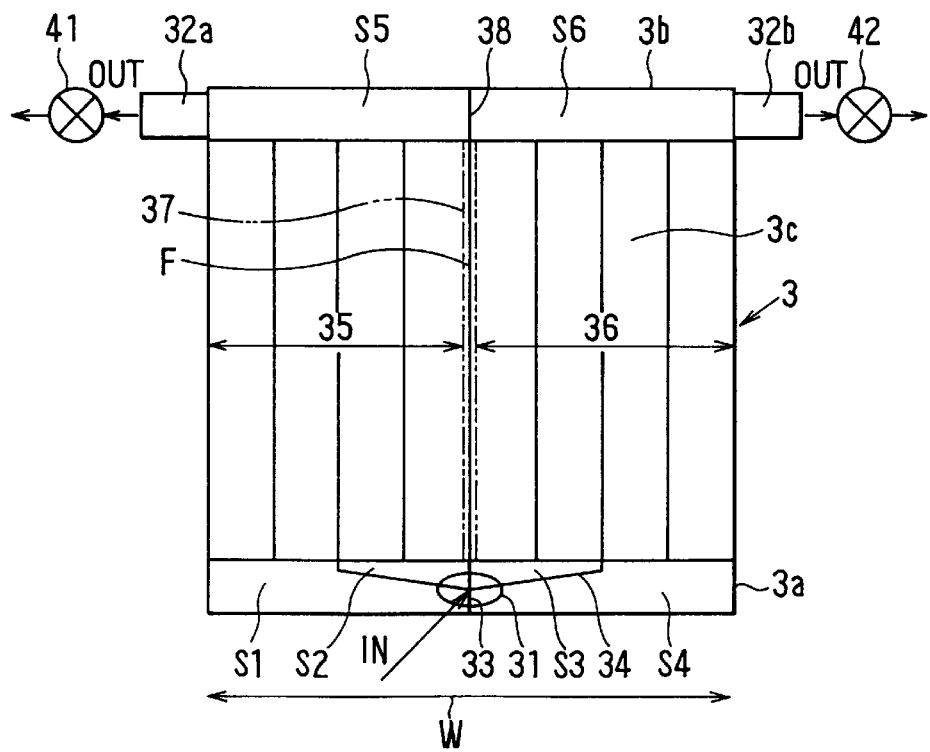
FIG. 11 is a schematic plan view showing a heating heat exchanger according to a fifth preferred embodiment of the present invention.

A fifth preferred embodiment of the present invention will be described with reference to FIG. 11.

In the fifth embodiment, similarly to the fourth embodiment, a heating heat exchanger 3 is applied to an air conditioning apparatus where a temperature of air blown toward a left side in the passenger compartment and a temperature of air blown toward a right side in the passenger compartment can be independently controlled. In the fifth embodiment, the partition structure in the inlet side tank 3*a* of the heating heat exchanger 3 is similar to that in the first embodiment. That is, the inner space of the inlet side tank 3*a* is partitioned along the width direction W by the crossed partition plates 33, 34 into the four spaces S1, S2, S3, S4 as shown in FIG. 11.

In the fifth embodiment, a partition plate 38 is disposed at a center portion of the outlet side tank 3*b* in the width direction W so that the inner space of the outlet side tank 3*b* is also partitioned into two spaces S5, S6 in the width direction W. Further, first and second hot water outlet pipes 32a, 32b through which hot water flows to the outside of the heating heat exchanger 3 are respectively disposed at left and right two end sides of the outlet side tank 3b.

In the air conditioning case 8, the partition plate 37 extending from the core portion 3c to a downstream air side of the heating heat exchanger 3 is disposed on the extending line F of the partition plates 33, 38. Therefore, an air passage in the core portion 3c and the downstream air passage of the heating heat exchanger 3 are partitioned into left and right side passages, similarly to the fourth embodiment. In the fifth embodiment, a first control valve 41 for independently controlling the amount of hot water flowing through the first core portion 35 and a second control valve 42 for independently controlling the amount of hot water flowing through the second core portion 36 are respectively provided at downstream water sides of the first and second hot water outlet pipes 32a, 32b.

Accordingly, in the fifth embodiment, by independently controlling the first control valve 41 and the second control valve 42, the amount of hot water flowing through the tubes 3d in the first core portion 35 and the amount of hot water flowing through the tubes 3d in the second core portion 36 can be respectively independently controlled. Therefore, the temperature of air blown from the first core portion 35 toward the left side (e.g., the front passenger's side) in the passenger compartment and the temperature of air blown from the second core portion 36 toward right side (e.g., the driver's side) in the passenger compartment can be independently controlled.

Further, in the fifth embodiment, hot water from the hot water inlet pipe 31 is divided by the partition plates 33, 34 in each side of the first core portion 35 and the second core portion 36. Therefore, in each of the first core portion 35 and the second core portion 36, the left and right temperature difference of blown-air can be reduced.

A sixth preferred embodiment of the present invention will be now described with reference to FIGS. 12–16B When the vehicle travels a curve and the heating heat exchanger 3 is inclined from the left-right direction (i.e., horizontal direction), a changed temperature of air blown from the heating heat exchanger 3 can be reduced in the sixth embodiment. The changed temperature is a changed amount of temperature of air blown from the heating heat exchanger 3 when the heating heat exchanger 3 is inclined by an inclined angle θ1 from a horizontal state (i.e., θ1=0). When the inclined state of the heating heat exchanger 3 is maintained at a predetermined time (e.g., 30 seconds), the changed temperature of blown-air in the left and right sides of the heating heat exchanger 3 is greatly increased.

Figure 12:
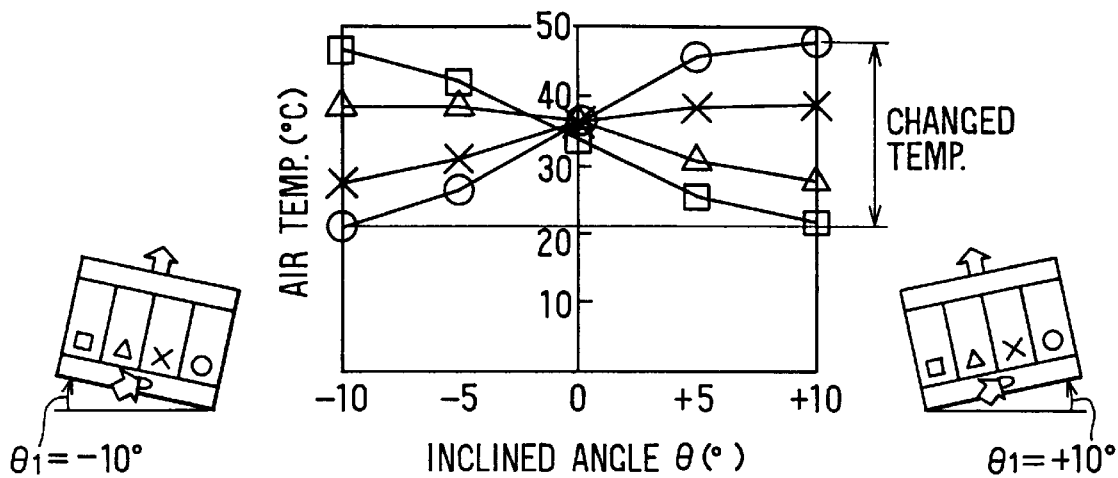
FIG. 12 is a graph showing the relationship between an inclined angle θ1 of the heating heat exchanger and a temperature of air blown from the heating heat exchanger according to a sixth preferred embodiment.

FIG. 12 shows the relationship between the inclined angle θ1(°) and the changed temperature of blown-air in the left and right sides of the heating heat exchanger 3. In the sixth embodiment, the heating heat exchanger 3 of the first embodiment is disposed in the air conditioning case 8, so that the left-right direction in FIG. 2 is toward the left-right direction of the vehicle and air passes through the heating heat exchanger 3 in the front-rear direction of the vehicle. In FIG. 12, the inclined angle θ1 of the heating heat exchanger 3 relative to the left-right direction (i.e., horizontal direction) has a manus angle when the left side end of the heating heat exchanger 3 rises at an upper side. When the right side end of the heating heat exchanger 3 rises at an upper side, the inclined angle θ1 has a plus angle. Further, in FIG. 12, a graph shown by □ is a temperature of air blown from a part of core portion 3c, into which hot water from the space S1 in the inlet side tank 3a flows; a graph shown by Δ is a temperature of air blown from a part of core portion 3c, into which hot water from the space S2 in the inlet side tank 3a flows; a graph shown by × is a temperature of air blown from a part of core portion 3c, into which hot water from the space S3 in the inlet side tank 3a flows; and a graph shown by ○ is a temperature of air blown from a part of core portion 3c, into which hot water from the space S4 in the inlet side tank 3a flows. In this case, the dimension of the heating heat exchanger 3 in the width direction W is 240 mm, and the other experimental conditions are similar to those in FIG. 4.

As shown in FIG. 12, when the inclined angle θ1 of the heating heat exchanger 3 is changed in a range of −10°–10°, the changed temperature of blown-air in the left and right sides of the heating heat exchanger 3 can be increased approximately at 28° C. in maximum; and therefore, the temperature difference of air blown from the left and right sides of the heating heat exchanger 3 is increased. Thus, in this case, it is difficult to give a suitable air-conditioning feeling to both of a passenger at the right side in the passenger compartment and a passenger at the left side in the passenger compartment.

Figure 13A:
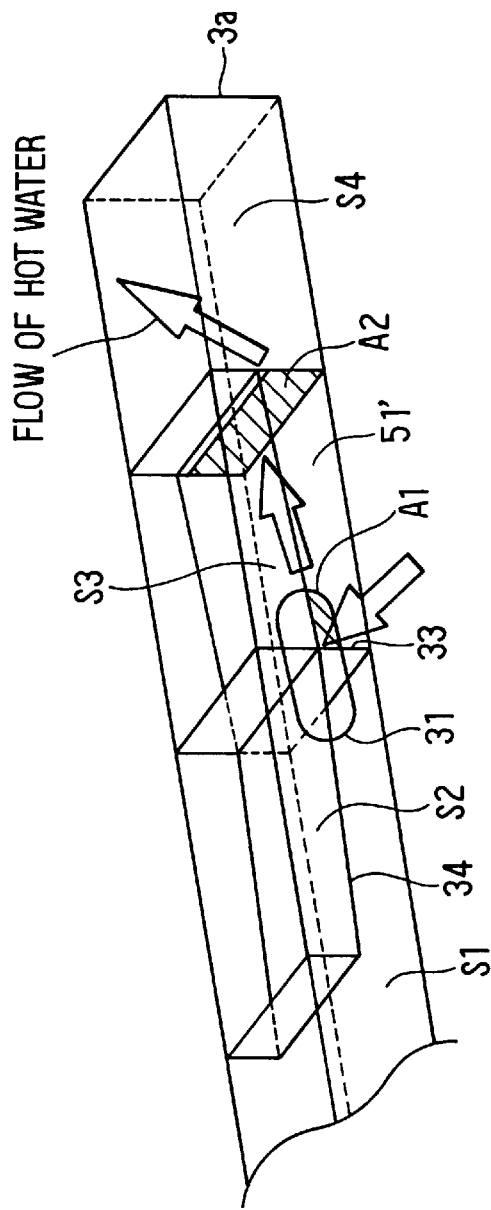
FIGS. 13A, 13B, 13C are diagrammatic views for explaining problems due to an increase of water-passing sectional area in an inlet side tank of the heating heat exchanger.
Figure 13C:
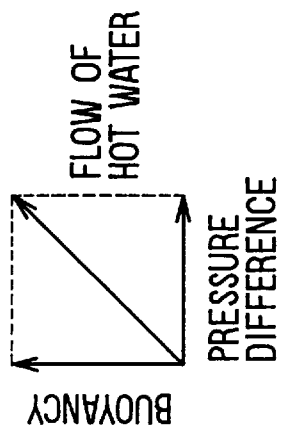
Figure 13B:
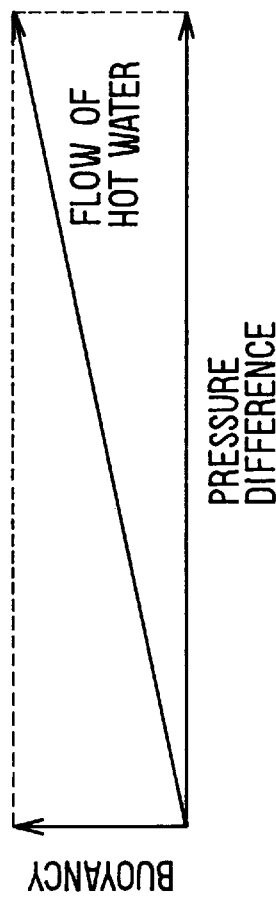

The inventors experiment and study the reason why the changed temperature of blown-air in the left and right sides of the heating heat exchanger 3 is increased by inclining the heating heat exchanger 3. First, when a water-passing sectional area in the inlet side tank 3a is rapidly increased, the changed temperature of blown-air of the heating heat exchanger 3 is increased. As shown in FIG. 13A, because the hot water inlet pipe 31 is divided into four parts by the partition plates 33, 34, the water-passing sectional area A1 of the hot water inlet pipe 31 for the space S4 is about 40 mm². On the other hand, the water-passing sectional area A2 of a tank water passage 51' for the space S4 is rapidly increased to be more than 200 mm² when the heating heat exchanger 3 is inclined as shown in FIG. 13A. As a result, as shown in FIG. 13B, because the pressure difference becomes larger in the hot water inlet pipe 31, hot water rapidly flows through the water-passing sectional area A1 of the hot water inlet pipe 31. However, as shown in FIG. 13C, because the water-passing sectional area A2 of the tank water passage 51' for the space S4 is rapidly increased, the pressure difference is rapidly decreased; and therefore, the flow rate of hot water is rapidly decreased. Thus, the influence of the buoyancy of hot water is relatively increased, and the amount of hot water flowing into the space S4 is relatively decreased.

On the other hand, when the left side end of the heating heat exchanger 3 rises, the space S4 is placed at the inclined lower side; and therefore, the influence of buoyancy is further increased relative to the flow of hot water. Thus, the amount of hot water flowing into the space S4 is further decreased.

Figure 14A:
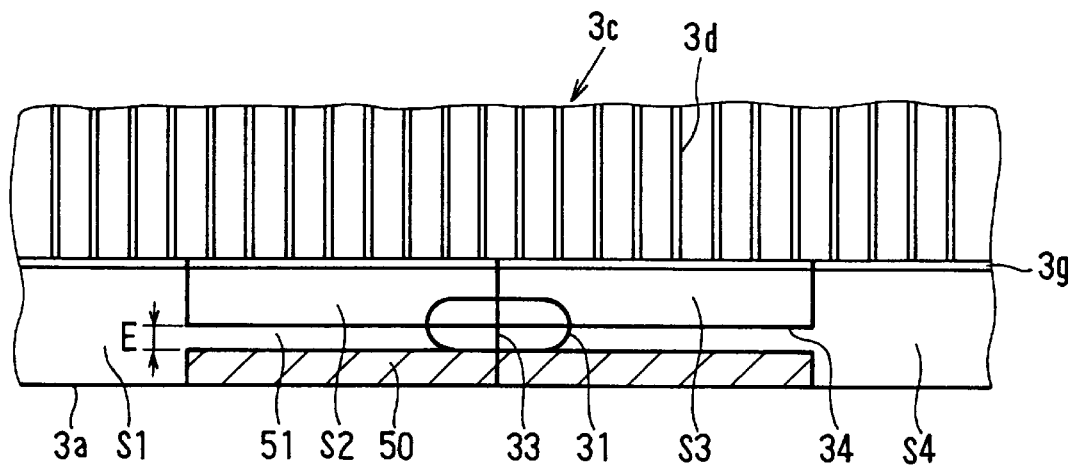
FIGS. 14A and 14B are cross-sectional views showing main portions of the heating heat exchanger according to the sixth embodiment of the present invention.
Figure 14B:
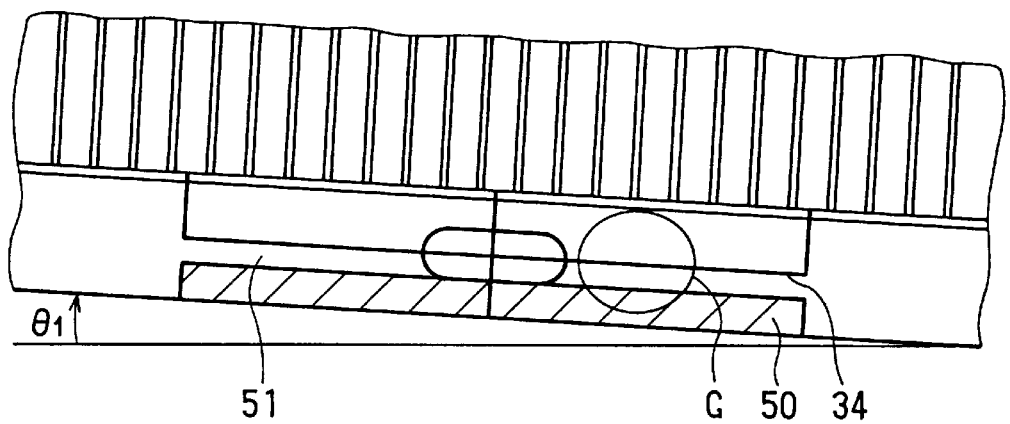
Figure 14C:
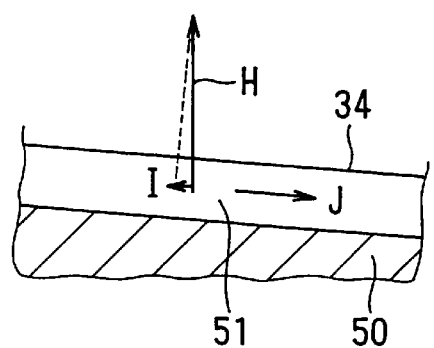
FIG. 14C is a partly enlarged view showing a portion indicated by G in FIG. 14B.

To prevent the problem, in the sixth embodiment, a spacer member 50 is disposed in the inlet side tank 3a to be opposite to the partition plate 34 to form a predetermined distance E therebetween, as shown in FIGS. 14A, 14B, 14C. Therefore, in the inlet side tank 3a, a restricted water passage 51 is formed between the partition plate 34 and the spacer member 50. Because the pressure difference (flow of hot water) is maintained at a high value in the water passage 51, buoyancy affected to hot water flowing toward the left and right spaces S1, S4 is relatively decreased, and the amount of hot water flowing into the space S4 or the space S1 can be increased.

Figure 15:
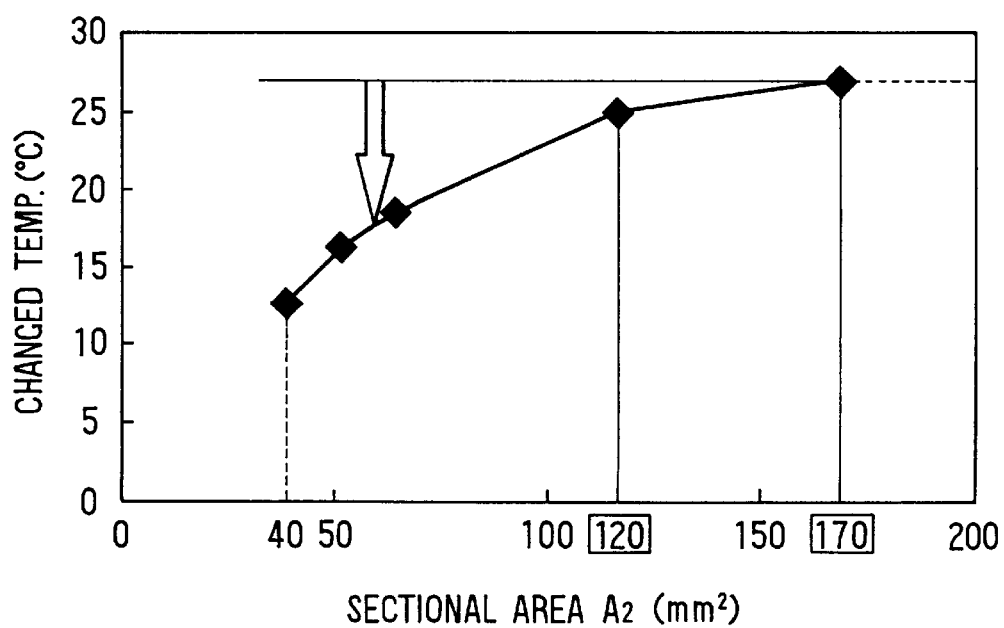
FIG. 15 is a graph showing the relationship between a water-passing sectional area A2 and a variation in a temperature of air blown from a heating heat exchanger according to the sixth embodiment.

Here, the effect of the spacer member 50 will be now described with reference to FIG. 15. FIG. 15 shows the relationship between a water-passing sectional area A2 of the water passage 51 and the changed temperature of blown-air in the left and right sides of the core portion 3c. Similarly to FIG. 12, the changed temperature is measured when the heating heat exchanger 3 is inclined by an inclined angle θ1 (θ1=−10°−+10°)° from the horizontal state (i.e., θ1=0). The dimension of the heating heat exchanger 3 in the width direction W is 240 mm, and the other experimental conditions are similar to those in FIG. 4. As shown in FIG. 15, when the water-passing sectional area A2 is made lower than 170 mm², the decreasing effect of the changed temperature is discovered. When the water-passing sectional area A2 is made lower than 120 mm², the changed temperature is remarkably decreased.

Each of the spacer member 50 and the partition plate 34 is made of aluminum (including aluminum alloy), and is connected to the inner wall of the inlet side tank 3a during integrally brazing the heating heat exchanger 3.

Figure 16A:
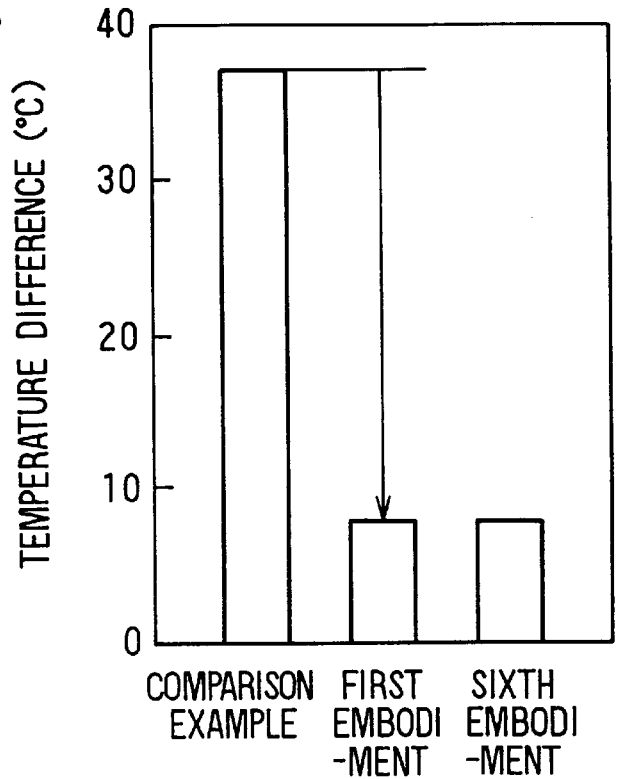
FIGS. 16A, 16B are graphs for comparing the effect of the heating heat exchanger in the first embodiment and the effect of the heating heat exchanger in the sixth embodiment.
Figure 16B:
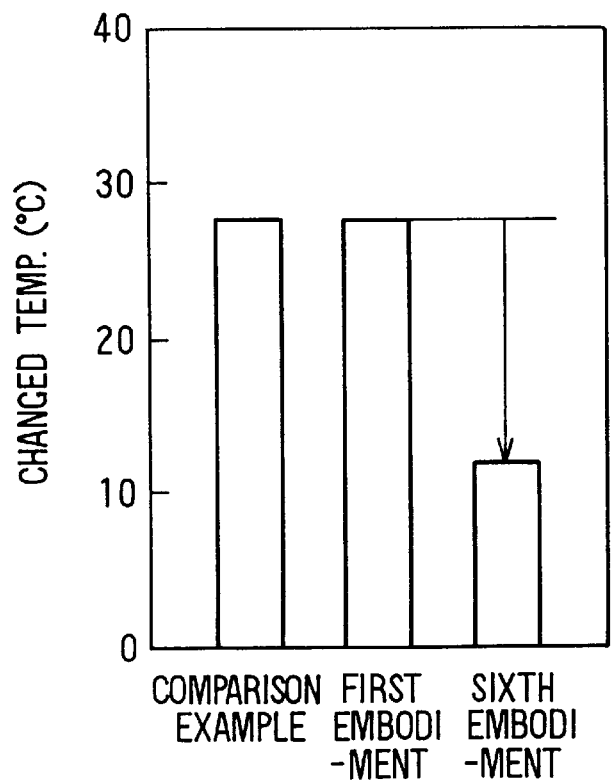

Next, the effect of the heating heat exchanger according to the sixth embodiment is described with reference to FIGS. 16A and 16B. In FIGS. 16A and 16B, the effects according to a comparison example, the first embodiment, the sixth embodiment are compared. In FIGS. 16A and 16B, the dimension of the heating heat exchanger 3 in the width direction W is 240 mm, and the other conditions are similar to those in FIG. 4. In the comparison example, the partition plates 33, 34 are not provided, and the other structures are similar to the first embodiment. On the other hand, in the sixth embodiment, the spacer member 50 is disposed in the inlet side tank 3a, and the water-passing sectional area A2 of the tank water passage 51 is set at 40 mm² to be equal to the water-passing sectional area A1 of the hot water inlet 31.

FIG. 16A shows the left-right temperature difference (i.e., the maximum temperature difference) when the heating heat exchanger 3 is placed in the horizontal state (θ1=0). As shown in FIG. 16A, in the first embodiment and the sixth embodiment, the left-right temperature difference is greatly decreased as compared with the comparison example. FIG. 16B shows the changed temperature of blown-air when the heating heat exchanger 3 is inclined by an inclined angle θ1 (θ1=−10°−+10°) from the horizontal state (θ1=0°). As shown in FIG. 16B, in the sixth embodiment, the changed temperature of blown-air is greatly decreased as compared with the comparison example and the first embodiment. Thus, in the sixth embodiment, by providing the spacer member 50, the changed temperature of air blown from the heating heat exchanger can be greatly reduced when the heat exchanger is inclined by an inclined angle θ1.

A seventh preferred embodiment of the present invention will be described.

In the seventh embodiment, the changed temperature of blown-air is further reduced as compared with the sixth embodiment. In the above-described sixth embodiment, FIG. 14A shows the horizontal state where the inclined angle θ1 of the heating heat exchanger 3 is 0°, and FIG. 14B shows the inclined state where the left side end of the heating heat exchanger 3 rises and the heating heat exchanger 3 is inclined by an angle θ1. Because the water passage 51 is inclined as shown in FIG. 14C, component force I of the buoyancy H of hot water is toward the left side. Here, hot water flows through the water passage 51 in a direction shown by the arrow J in the FIG. 14C. Therefore, a direction of the component force I of the buoyancy H is opposite to the hot water flow direction J. Thus, the amount of hot water flowing into the space S4 through the water passage 51 is decreased and the amount of hot water flowing into the space S1 through the water passage 51 is increased. As a result, in the above-described sixth embodiment, the temperature of air blown from a core portion corresponding to the space S4 is decreased and the temperature of air blown from a core portion corresponding to the space S1 is increased.

Figure 17A:
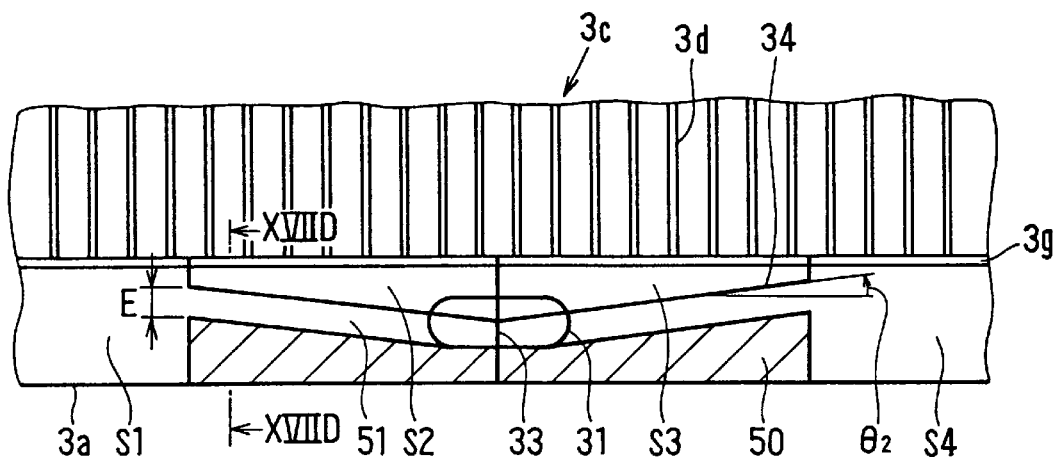
FIGS. 17A and 17B are cross-sectional views showing main portions of a heating heat exchanger according to a seventh preferred embodiment of the present invention.
Figure 17B:
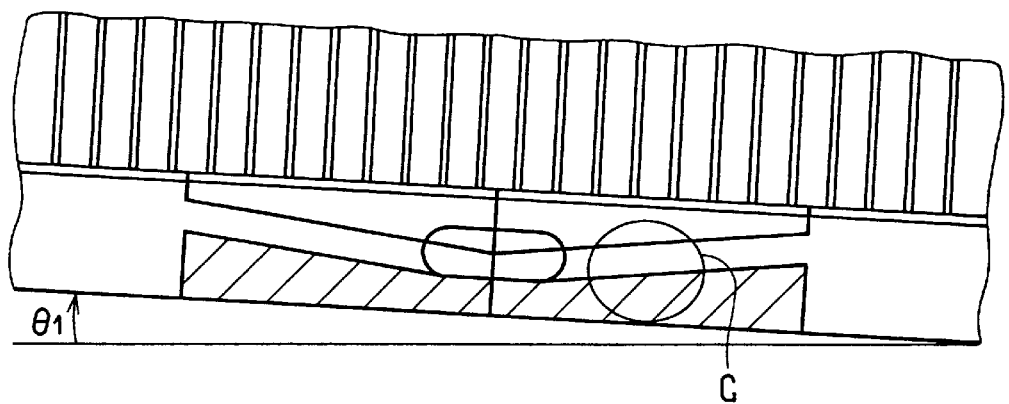
Figure 17C:
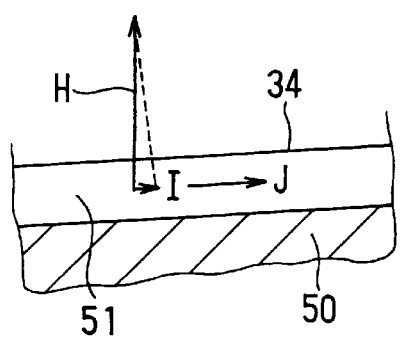
FIG. 17C is a partly enlarged view showing a portion indicated by G in FIG. 17B.
Figure 17D:
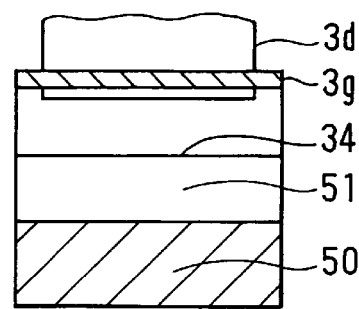
FIG. 17D is a cross-sectional view taken along line XVIID—XVIID in FIG. 17A.
Figure 18:
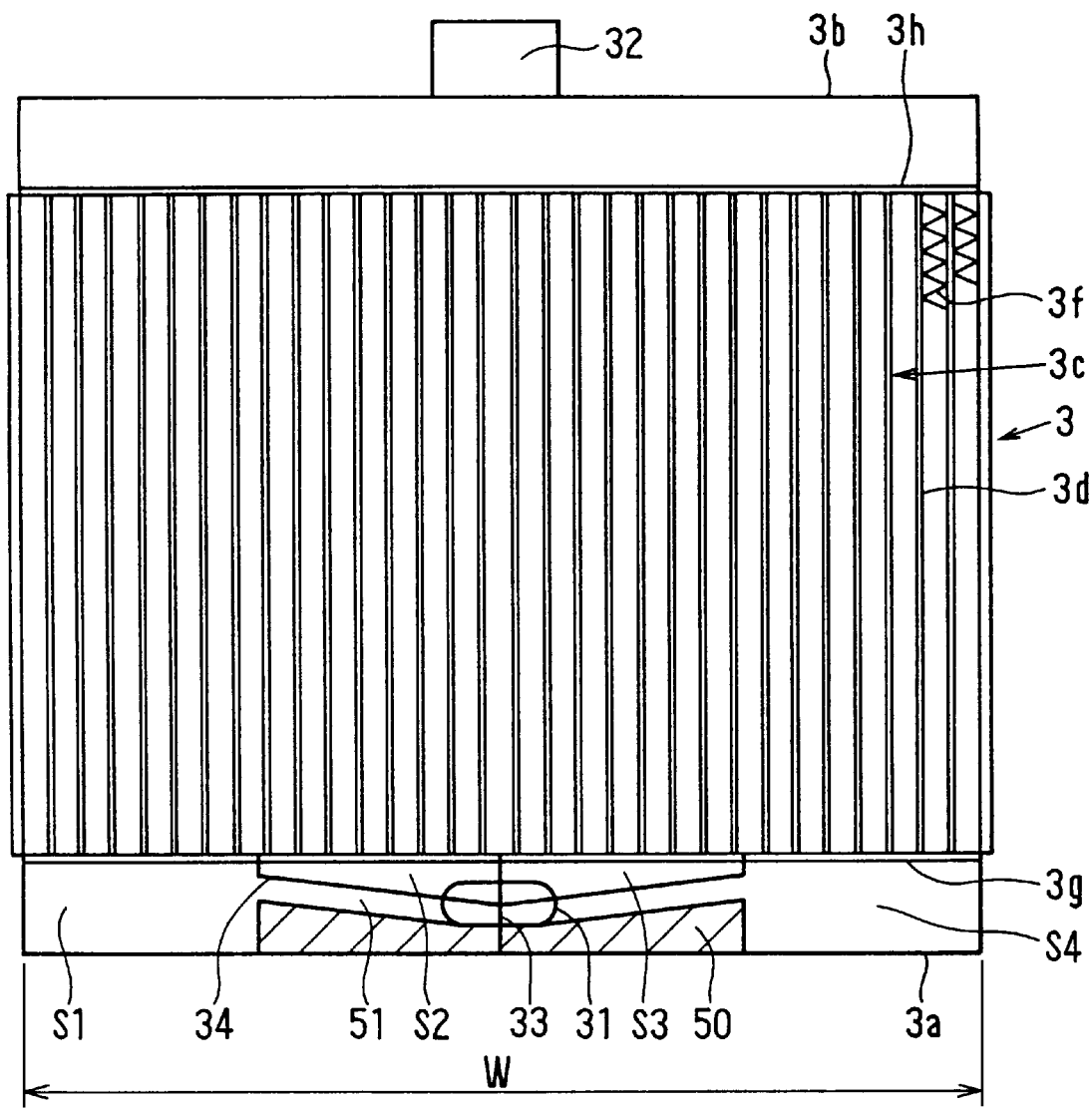
FIG. 18 is a partly sectional view showing the heating heat exchanger according to the seventh embodiment of the present invention.

To overcome the problem of the sixth embodiment, in the seventh embodiment, a partition plate 34 and a spacer member 50 are disposed in the inlet side tank 3a obliquely relative to the width direction W, as shown in FIGS. 17A–17D and 18. In the seventh embodiment, each inclined angle θ2 of the partition plate 34 and the spacer member 50 is set to be larger than the maximum inclined angle θ1 (e.g., θ1=10°) of the heating heat exchanger 3, which is caused when the vehicle generally travels. In this case, as shown in FIG. 17B and 17C, even when the heating heat exchanger 3 is inclined so that the left side end thereof rises, the right side of the water passage 51 rises in the G portion shown in FIG. 17B; and therefore, the direction of the component force I of the buoyancy H is toward the hot water flow direction J. That is, the direction of the component force I of the buoyancy H is same as the hot water flow direction J. Thus, the amount of hot water flowing into the space S4 through the water passage 51 can be made approximately equal to the amount of hot water flowing into the space S1 through the water passage 51. As a result, in the seventh embodiment, the changed temperature of blown-air due to the inclination of the heating heat exchanger 3 can be further lowered.

An eighth preferred embodiment of the present invention will be now described with reference to FIGS. 19A and 19B. In the eighth embodiment, a plate-like guide member 52 is used instead of the spacer member 50 in the seventh embodiment as shown in FIGS. 19A and 19B. The guide member 52 is made of metal such as aluminum, and is connected to the inner wall of the inlet side tank 3a during integrally brazing the heating heat exchanger 3. The guide member 52 is disposed in the inlet side tank 3a to form a predetermined distance E between the guide member 52 and the partition plate 34. Therefore, a restricted water passage 51 is formed between the guide member 52 and the partition plate 34. Thus, the guide member 52 has an effect similar to the spacer member 50 in the seventh embodiment.

Figure 20A:
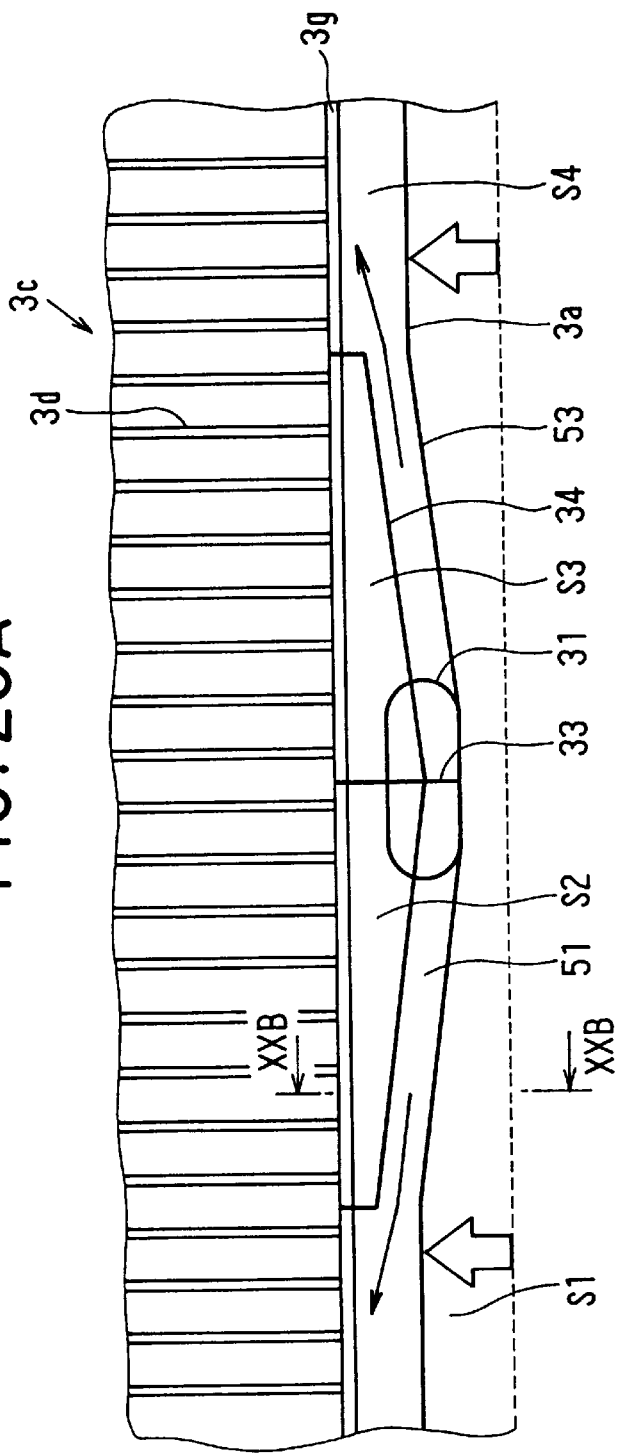
FIG. 20A is a cross-sectional view showing a main portion of a heating heat exchanger according to a ninth preferred embodiment of the present invention.
Figure 20B:
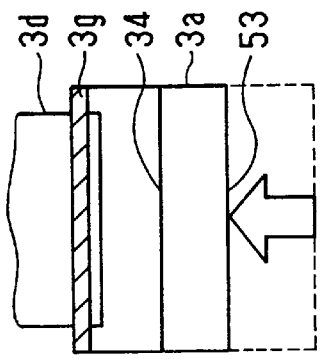
FIG. 20B is a cross-sectional view taken along line XXB—XXB in FIG. 20A.

A ninth preferred embodiment of the present invention will be described with reference to FIGS. 20A and 20B.

In the ninth embodiment, instead of the spacer member 50 in the seventh embodiment and the guide member 52 in the eighth embodiment, the shape of the inlet side tank 3a is changed, and the inlet side tank 3a itself has a surface 53 for performing the function of the guide member 52. That is, the bottom of the inlet side tank 3a is displaced from the chained line to the solid line in FIGS. 20A, 20B. Therefore, the inner space of the inlet side tank 3a is reduced, and the bottom of the inlet side tank 3a forms the guide surface 53.

Figure 21:
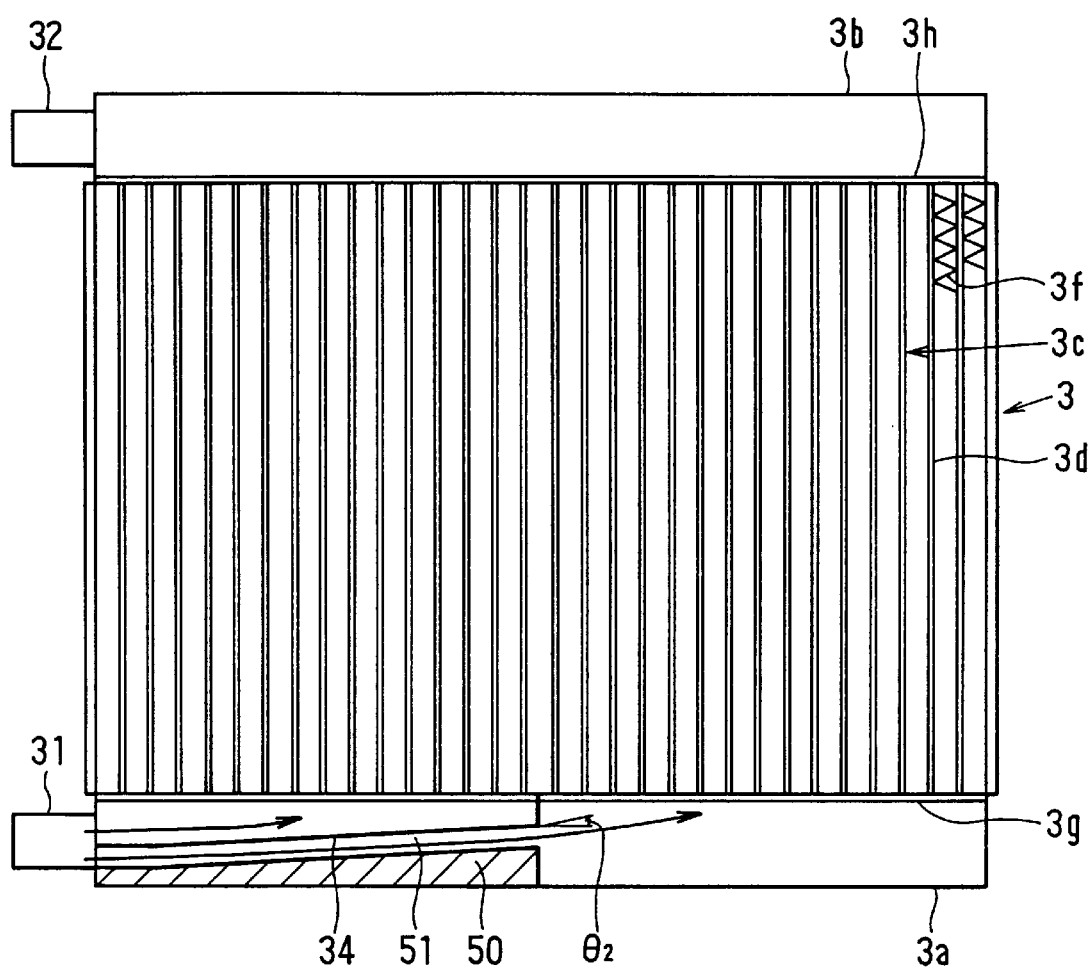
FIG. 21 is a partly sectional view showing a heating heat exchanger according to a tenth preferred embodiment of the present invention.

A tenth preferred embodiment of the present invention will be now described with reference to FIG. 21.

In the tenth embodiment, the hot water inlet pipe 31 and the hot water outlet pipe 32 are respectively disposed at the same end sides of the inlet side tank 3a and the outlet side tank 3b. In this type heating heat exchanger 3, each of a partition plate 34 and a spacer member 50 is disposed obliquely by an incline angle θ2 in the inlet side tank 3a, as shown in FIG. 21.

An eleventh predetermined embodiment of the present invention will be now described with reference to FIG. 22.

Figure 5:
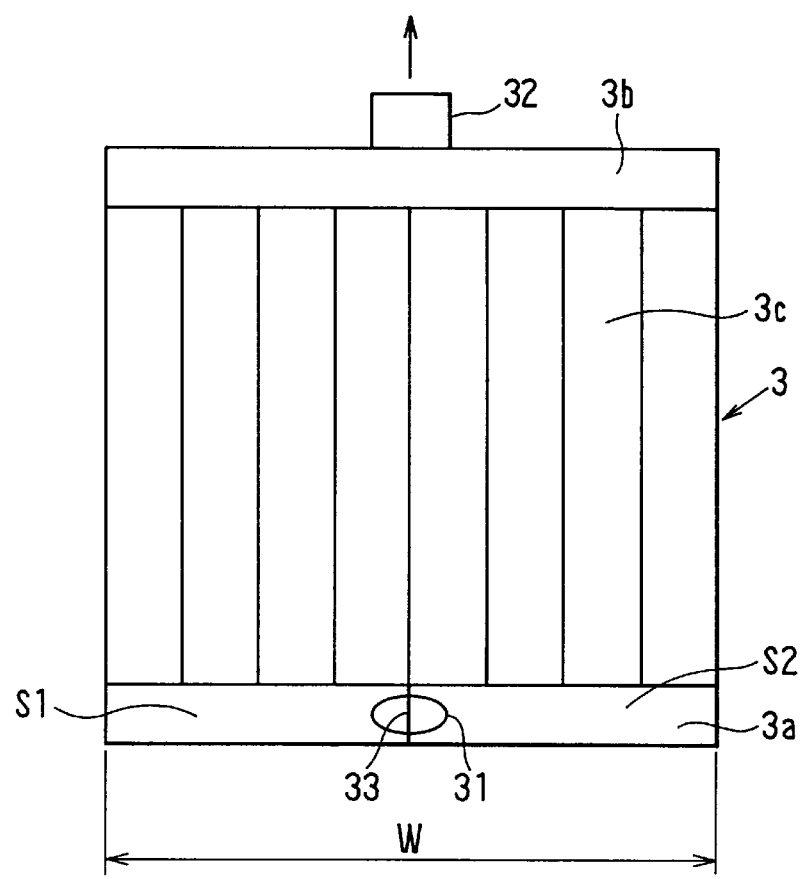
FIG. 5 is a schematic plan view showing a heating heat exchanger according to a second preferred embodiment of the present invention.
Figure 22:
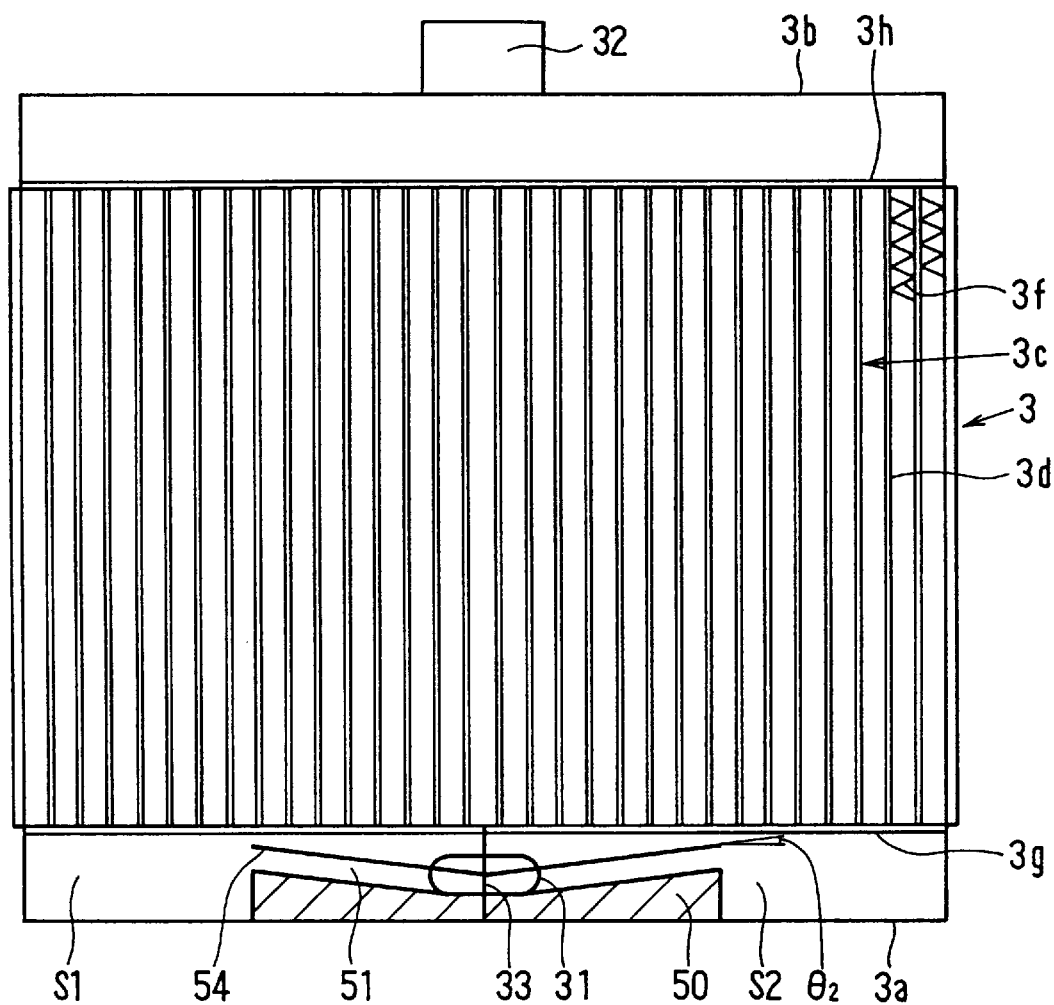
FIG. 22 is a partly sectional view showing a heating heat exchanger according to an eleventh preferred embodiment of the present invention.

In the eleventh embodiment, as shown in FIG. 22, only the partition plate 33 extending in the up-down direction is disposed in the inlet side tank 3a similarly to the second embodiment shown in FIG. 5. In the heating heat exchanger 3, the spacer member 50 and a guide member 54 inclined by an incline angle θ2 are disposed in the inlet side tank 3a. The guide member 54 is made of metal such as aluminum, and is connected to the inner wall of the inlet side tank 3a. The guide member 54 is disposed to be opposite to the spacer member 50 to forme a predetermined distance therebetween. Therefore, a restricted water passage 51 is formed between the guide member 54 and the spacer member 50.

Figure 23:
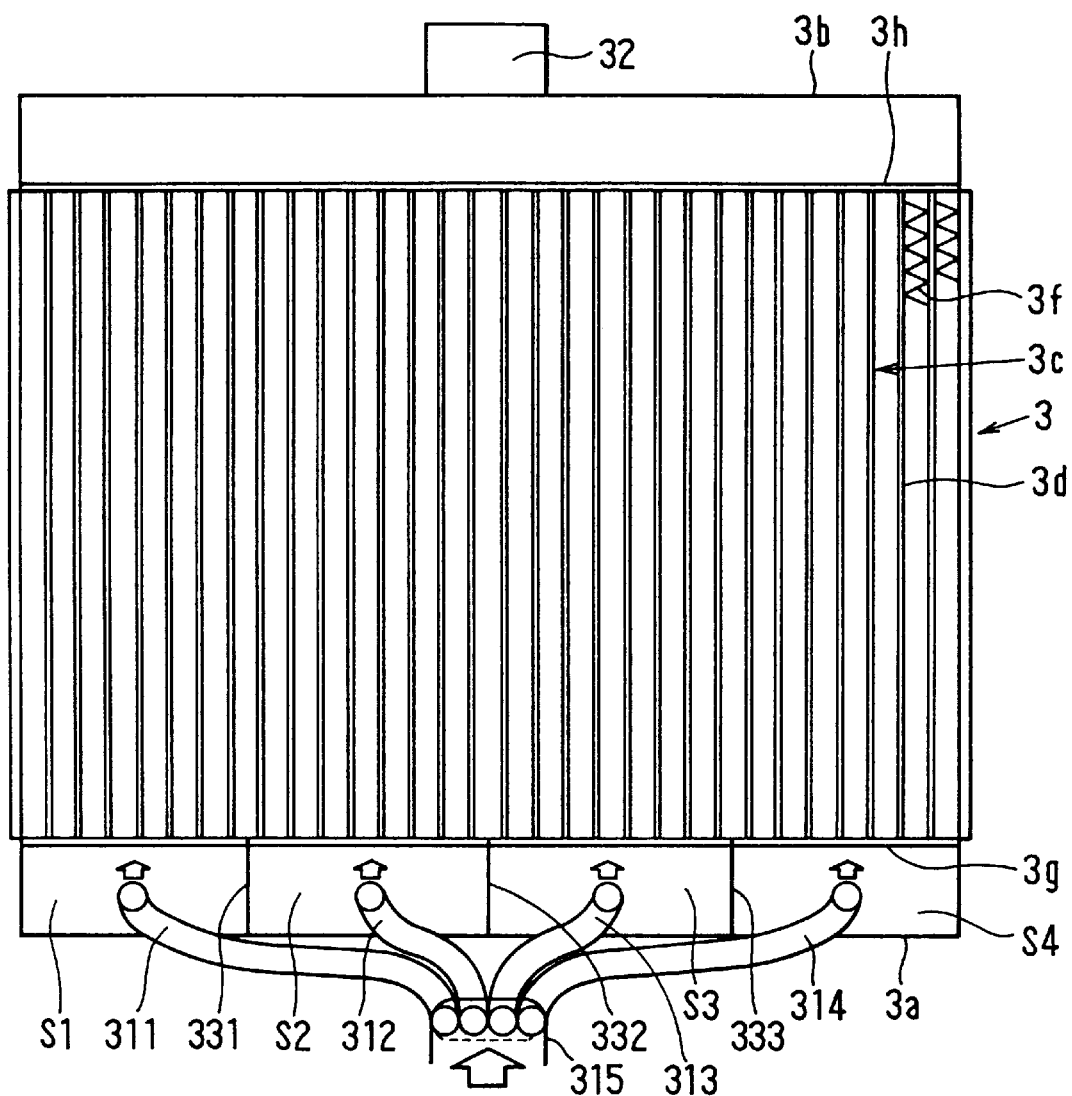
FIG. 23 is a partly sectional view showing a heating heat exchanger according to a twelfth preferred embodiment of the present invention.

A twelfth preferred embodiment of the present invention will be now described with reference to FIG. 23.

In each of the above-described embodiments, a single water passage is formed in the hot water inlet pipe 31, and the inner space of the inlet side tank 3a is partitioned into a plurality of spaces S1–S4. In the twelfth embodiment, as shown in FIG. 23, the inner space of the inlet side tank 3a is partitioned by three partition plates 331–333 into four spaces S1–S4 in the width direction W, a hot water inlet pipe 315 is divided into four pipes 311–314 to correspond to the four spaces S1–S4. Therefore, hot water from the four hot water inlet pipes 331–314 respectively independently flows into the four spaces S1–S4. That is, the four hot water inlet pipes 311–314 are connected to the common single hot water inlet pipe 315. Thus, the hot water inlet pipe 315 of the twelfth embodiment corresponds to the hot water inlet pipe 31 in each of the above-described embodiments.

In this type heating heat exchanger 3, the effect similar to that in the above-described embodiments can be proposed.

Although the present invention has been fully described in connection with preferred embodiments thereof with reference to the accompanying drawings, it is to be noted that various changes and modifications will become apparent to those skilled in the art.

For example, in the above-described first embodiment, the amount of hot water supplied to the heating heat exchanger 3 is adjusted by continually changing the opening degree of the valve body 17. That is, an analog-control type valve is used to control the amount of hot water. However, an electromagnetic valve may be used as the flow rate control valve 4.

In each of the above-described embodiments, the present invention is applied to a hot-water type heating apparatus for a vehicle; however, the present invention may be applied to a heating heat exchanger for the other use.

Such changes and modifications are to be understood as being within the scope of the present invention as defined by the appended claims.

What is claimed is:

1. A hot-water type heating apparatus comprising:
    a duct for forming an air passage;
    a heat exchanger, disposed in said air passage, for heating air passing therethrough using hot water as a heating source; and
    a flow rate control valve for controlling a flow rate of hot water supplied to said heat exchanger, wherein:
    said heat exchanger includes
        a core portion, having a plurality of tubes disposed in parallel, for performing heat-exchange between hot water flowing through said tubes and air in said air passage,
        an inlet side tank connected to one end of said core portion,
        an outlet side tank connected to the other end of said core portion,
        an inlet pipe through which hot water flows into said inlet side tank, and
        an outlet pipe through which hot water from said outlet side tank is discharged;
    said heat exchanger is disposed in said air passage in such a manner that hot water from said inlet side tank flows into said outlet side tank through said tubes in one way;
    said inlet side tank has a plurality of inner spaces partitioned from each other; and
    said inner spaces are formed in said inlet side tank in such a manner that hot water from said inlet pipe is divided to pass through the inner spaces, and flows into said tube of said core portion through said inner spaces.

2. The hot-water type heating apparatus according to claim 1, wherein:
    said inlet side tank is connected at a lower end of said core portion in an up-down direction of said core portion;
    said outlet side tank is connected to an upper end of said core portion in the up-down direction; and
    hot water from said inlet side tank flows through said tubes in one way from the lower end to the upper end of the core portion in the up-down direction.

3. The hot-water type heating apparatus according to claim 2, wherein:
    said heat exchanger is disposed in said air passage approximately vertically relative to a flow direction of air passing through said heating heat exchanger.

4. The hot-water type heating apparatus according to claim 2, wherein:
    said heat exchanger is disposed in said air passage obliquely relative to the up-down direction of said core portion.

5. The hot-water type heating apparatus according to claim 1, wherein:
    each of said spaces of said inlet side tank has a dimension in a longitudinal direction of said inlet side tank; and
    the dimension is lower than 100 mm.

6. The hot-water type heating apparatus according to claim 1, wherein:
    said inlet side tank has therein a partition member for partitioning said inner spaces of said inlet side tank from each other in a longitudinal direction of said inlet side tank; and
    said partition member is disposed to extend from said inlet pipe to said tubes of said core portion.

7. The hot-water type heating apparatus according to claim 2, wherein:
    said inlet side tank forms a tank water passage having a water-passing sectional area, through which hot water from said inlet pipe flows in a longitudinal direction of said inlet side tank;
    said inlet pipe forms a pipe water passage having a water-passing sectional area through which hot water flows into said tank water passage; and
    said inlet side tank has prevention means for preventing the sectional area of said tank water passage from being rapidly increased as compared with the sectional area of said pipe water passage.

8. The hot-water type heating apparatus according to claim 2, wherein:
    said inlet side tank forms a tank water passage through which hot water from said inlet pipe flows in a longitudinal direction of said inlet side tank; and
    said tank water passage extending from said inlet pipe has a top end in the longitudinal direction of said inlet side tank, and said tank water passage is inclined to become closer to the core portion as said tank water passage extends toward the top end thereof.

9. A hot-water type heating apparatus for heating a passenger compartment of a vehicle having a water-cooled engine, said heating apparatus comprising:

a duct for forming an air passage;

a heat exchanger, disposed in said air passage, for heating said passenger compartment by performing heat-exchange between cooling water having cooled said water-cooled engine and air to be blown into said passenger compartment; and a flow rate control valve for controlling a flow rate of hot water supplied to said heat exchanger, wherein:

said heat exchanger includes a core portion, having a plurality of tubes disposed in parallel, for performing heat-exchange between hot water flowing through said tubes and air in said air passage, an inlet side tank connected to one end of said core portion, an outlet side tank connected to the other end of said core portion, an inlet pipe through which hot water flows into said inlet side tank, and an outlet pipe through which hot water from said outlet side tank is discharged;

said heat exchanger is disposed in said air passage in such a manner that hot water from said inlet side tank flows into said outlet side tank through said tubes in one way;

said inlet side tank has a partition member for partitioning an inner space of said inlet side tank into a plurality of spaces; and said partition member is disposed in said inlet side tank in such a manner that hot water from said inlet pipe is divided to pass through the inner spaces, and flows into said tube of said core portion through said inner spaces.

10. The hot-water type heating apparatus according to claim 9, wherein:

said inlet side tank is connected at a lower end of said core portion in an up-down direction of said core portion;

said outlet side tank is connected to an upper end of said core portion in the up-down direction; and hot water from said inlet side tank flows through said tubes in one way from the lower end to the upper end of the core portion in the up-down direction.

11. A hot-water type heating apparatus comprising:

a duct for forming an air passage;

a partition plate for partitioning said air passage into a first air passage and a second air passage;

a heat exchanger, disposed in said air passage, for heating air passing therethrough using hot water as a heating source; and a flow rate control valve for controlling a flow rate of hot water supplied to said heat exchanger, wherein:

said heat exchanger includes a heater core, having a plurality of tubes disposed in parallel, for performing heat-exchange between hot water flowing through said tubes and air in said air passage, an inlet side tank connected to one end of said heater core, an outlet side tank connected to the other end of said heater core, an inlet pipe through which hot water flows into said inlet side tank, and an outlet pipe through which hot water from said outlet side tank is discharged;

said heater core is partitioned by said partition plate into a first core portion and a second core portion;

said flow rate control valve includes a first valve for independently controlling a flow rate of hot water supplied to said first core portion, and a second valve for independently controlling a flow rate of hot water supplied to said second core portion;

said heat exchanger is disposed in said air passage in such a manner that hot water from said inlet side tank flows into said outlet side tank through said tubes in one way;

said inlet side tank has at least four inner spaces partitioned from each other; and hot water from said inlet pipe is divided to pass through the inner spaces, in such a manner that hot water flows into said tube of said first core portion through two inner spaces of said inlet side tank and flows into said tube of said second core portion through the other inner spaces of said inlet side tank.

12. The hot-water type heating apparatus according to claim 11, wherein:

said inlet side tank is connected at a lower end of said core portion in an up-down direction of said core portion;

said outlet side tank is connected to an upper end of said core portion in the up-down direction; and hot water from said inlet side tank flows through said tubes in one way from the lower end to the upper end of the core portion in the up-down direction.

13. The hot-water type heating apparatus according to claim 12, wherein:

said inlet side tank has therein a partition member for partitioning said inner spaces of said inlet side tank from each other in a longitudinal direction of said inlet side tank; and said partition member is disposed to extend from said inlet pipe to said tubes of said core portion.

* * * * *